United States Patent [19]

Buchl et al.

[11] Patent Number: 6,085,846
[45] Date of Patent: Jul. 11, 2000

[54] POTENTIOMETER-BASED GAUGE WHEEL DEVICE POSITIONING SYSTEM AND METHOD

[75] Inventors: Andrew F. Buchl, Sioux City, Iowa; Joseph W. Trudeau; Joseph Truhe, both of Jefferson, S. Dak.

[73] Assignee: Automatic Depth Control, LLC, Sioux City, Iowa

[21] Appl. No.: 09/346,183

[22] Filed: Jul. 1, 1999

[51] Int. Cl.[7] .............................. A01C 5/00; F15B 13/16
[52] U.S. Cl. .................................... 172/4; 91/361
[58] Field of Search ............................... 37/348; 111/62, 111/63, 134, 200; 73/84; 56/10.2 R, 10.2 A, 10.2 E, 10.2 D, 10.2 F; 172/1, 2, 4, 4.5, 7, 9, 10, 239; 91/361, 459, 461, 527–534

[56] References Cited

U.S. PATENT DOCUMENTS 4,646,620  3/1987  Buchl .
4,825,655  5/1989  Buchl et al. .

FOREIGN PATENT DOCUMENTS 2015835  1/1991  Canada .

OTHER PUBLICATIONS

Bourgault Brochure, "Quick Change" Mounted Packer System, 4 pages (Date unknown).
Bourgault Brochure, 5700 Air Hoe Drill, 4 pages (Date unknown).
Flexi–Coil Brochure, 5000 Air Drill, 6 pages, (Date unknown).
John Deere Brochure, Chisel Plows, Mulch Tillers, V–Rippers, pp. 1–23 (Aug. 1993).
Kiss, G.C. et al., "An Analysis of Forces on Cultivator Sweeps and Spikes", *Canadian Agricultural Engineering*, vol. 23, No. 2, pp. 78–83 (1981).
Raven Industries, Kee Depth Control Installation and Service Manual, 1–59 and cover/table of contents pages (Date unknown).
Rebound Compensation Valve Model RB–4S–650, Patent No. 4,825,655 2 pages (Date unknown).
Rebound Valve Model AB–1510 Series Cylinders (Master/Slave), Patent No. 4,825,655, 2 pages (Date unknown).
Sun Hydraulics® Corporation, Cartridge Valve Technology, pp. 1–67 and cover/index pages Aug. 1987).

*Primary Examiner*—Robert E. Pezzuto
*Attorney, Agent, or Firm*—Merchant & Gould P.C.

[57] ABSTRACT

A potentiometer-based gauge wheel position sensor system for use as part of an automatic depth control system. The potentiometer-based gauge wheel position sensor system works with a Console and remote Controller mounted in the tractor cab, power beyond Valving, and Depth Sensors, either ground contact or non-ground contact, mounted on the frame of the implement. The depth sensing system is provided to sense the actual penetration of an implement tool by determining the height of the implement frame above the ground. The gauge wheel system comprises an inverted pyramid structure having a horizontal support member coupled to the implement frame. At one end of the horizontal support member, a compressible vertical support member is coupled between a wheel and the horizontal support member. At the other end of the horizontal support member, a wheel leg extension is coupled between the wheel and the horizontal support member. A potentiometer-based sensor assembly is coupled between the wheel leg extension and the horizontal support member such that a voltage is generated corresponding to the angle between the wheel leg extension and the horizontal support member. This signal representing the angle can be used to calculate the position of the implement as its height and/or depth above or below the ground changes which causes the compressible vertical support member to change its length corresponding to the geometry of the implement height.

11 Claims, 17 Drawing Sheets

FIG. 8 — WIRING FOR GAGE WHEELS

FIG. 9 WIRING FOR ULTRASOUND

WIRING FOR VALVES

POTENTIOMETER-BASED GAUGE WHEEL DEVICE POSITIONING SYSTEM AND METHOD

BACKGROUND OF THE INVENTION

1. Field of the Invention

This invention relates in general to a method and apparatus to provide an automatic depth and/or height control system, and more particularly to a method and apparatus to automatically control the depth or height position of an agricultural or other mobile tool using a hydraulic system.

2. Description of Related Art

This invention generally relates to the inventions disclosed within U.S. Pat. No. 4,646,620, and U.S. Pat. No. 4,825,655, which are both incorporated herein in their entirety, that relate to fluid cylinder systems and allow for control of piston stroke positions.

Historically, the depth of tool penetration for agricultural equipment, or other soil penetration equipment, has been set by mechanical devices which restrict the retraction or extension of hydraulic cylinders. The cylinder(s) is typically mounted between the frame of the implement and the leg of an implement carrier wheel. Thus, height of the frame above the ground, which determines tool penetration, could be hydraulically changed to a more shallow depth (ie., less tool penetration) but not to a deeper depth typically because of mechanical restriction. The prior approach is still in use but does not offer good control of material discharge, liquid manure deposits, preparation tillage, ground cover, moisture retention, seed bed preparation or depth of seeding. The prior approach is less desirable because on hard ground the wheels ride up onto the surface, the tools are not set deeper, and this results in shallow tool penetration. On soft ground where the wheels ride deeper, hydraulic corrections can be made with use of manual hydraulics, but fine adjustments are difficult and continuous.

Similar issues also exist within similar mobile tools such as sprayer booms, road side grass mowers, and other earth moving, working or discharging equipment. In these other applications, both tool height and depth above the ground is to be controlled. The height and depth measurement for the tool as well as the control system used to the height and depth of these tools are improved by the present invention.

Recently, automatic depth control systems have been brought onto the market which control the extension and retraction of the implement carrier cylinders in order to hold a select depth. One such system is disclosed within U.S. Pat. No. 4,646,620. Automatic depth control is controlled by a microprocessor in the tractor cab, sensors on the implement frame and power beyond valving for hydraulic corrections to maintain a given tool penetration. Sensors for this system were depth gauge wheels.

Another such system sold by Raven Industries of Sioux Fall, S. Dak., has a rotary dial on the console to set the working depth. It is difficult to change depth settings on-the-go since selective depths are not programmed. Sensors are Piezo ultrasonic. Power beyond valving requires one of three separate and distinct manifold assembles, either gear pump, pressure compensated or load sensing. This requirement for three separate and distinct valving manifolds for different tractor hydraulic systems is costly; also, the valving is in-line but cannot accommodate manual return flows. Thus, changes from automatic to manual or vice versa require a hoses to be reconfigured.

Thus, there is a need for a more efficient system that is more adaptable to on-the-go farming practices and offers better control of depths for operations on varying soil textures (sand, silt and clay), weather affect upon these soils, and control for various implements, applications, and field conditions.

SUMMARY OF THE INVENTION

To overcome the limitations in the prior art described above, and to overcome other limitations that will become apparent upon reading and understanding the present specification, the present invention discloses a console which can detect and switch methodology to either gauge wheel, or ultrasonic sensor. The Console has a LED readout of the rolling average of depth in conjunction with a bar graph depicting variation from the set depth. The bar graph flashes an light outside the WINDOW to denote a hydraulic correction under way. Depth of penetration can be set in inches and $\frac{1}{10}$ of an inch.

Further, a Controller uses a five position detente joy stick to select any of four programmed depths of tool penetration, plus a RAISE position. A Rocker Switch establishes working depths for temporary or permanent memory, with permanent memory made with a SET button. A toggle switch places the system in the RUN mode, where automatic depth corrections are made, or places the system in a HOLD mode wherein no hydraulic corrections can be made.

According to another aspect of the invention, there is a hydraulic integrated manifold that is located between the tractor hydraulics and the implement cylinders. This manifold has an arrangement of solenoids and valving that enable the manifold to accommodate all three tractor hydraulic systems presently on the market; namely, Constant Flow Pumps, Pressure Compensated Pumps, and Load Sensing Pumps. This manifold is an in-line mounting that permits double acting flows through it in either direction, manual or automatic operation. Slow flows for hydraulic corrections are set by either an orifice, an adjustable restrictor or proportional valve driven by the Console. An orifice or adjustable restriction incorporates programming which adjusts to overshooting or undershooting of the window by the tool in $\frac{1}{10}$ of a second increments. The programming adjusts the time in which the tool is connected either earlier or later than optimally necessary to eliminate the overshoot or undershoot.

According to still another aspect of this invention, an assembly consisting of a bracket, a potentiometer mechanism and an extending and hinged arm is mounted to the frame of a seeder. The hinged arm is mounted to the seeder leg which in turn is mounted to the seeder frame on one end and carries the seeding mechanism on the other end. This mounting enables a disclosure of angle between the seeder frame and the leg carrying the seeding mechanism. Variations of this angle translate into depth variations. This is a variation of the depth gage wheel.

Further, the gauge wheel is an inverted pyramid design which permits the wheel to run approximately two (2) feet ahead of the trailing wheel type. This permits the tire to run on unworked ground, thus preventing, to a degree, mud or soil buildup on the face of the tire which is not now running on worked soil; also the tire does not, then, interfere or inhibit the tools from working mulch.

The gauge wheel can be mounted above the implement frame for implements with low clearance (typically 24 inches) or below the frame for implements with high clearance (typically up to 32 inches).

Holes placed at one inch intervals permit tension to be placed on the shock absorber. This is a positive positioning, not subject to shipping of plates.

According to still another aspect of this invention, an ultrasonic housing is mounted to a swivel or hinge to keep it pointed, by gravity, toward the ground. The electro-static transducer has a cover, commercially referred to as Union Ocean Guard (UOG), over the transducer to protect it against weather, salt, caustic chemicals and overall contamination. It also incorporates a grill to protect it against roughage, such as corn stalks, that could damage the transducer. A vent is provided on the exterior of the transducer insert to prevent pressure buildup (typically 1½ to 2 psi) if the unit becomes hermetically sealed, and also enables ventilation to prevent moisture accumulation and resultant corrosion. Neither the UOG or the grill, ¼×¼, will substantially affect sound wave transmission. A Piezo quartz face transducer is an option for an electrostatic transducer.

Thus there have been outlined rather broadly the more important features of the invention in order that the detailed description thereof may be better understood, and in order that the present contribution to the art may be better appreciated. There are, of course, additional features of the invention that will be described hereinafter and will form the subject matter of the claims appended hereto. Those skilled in the art will appreciate that the conception on which the disclosure is based may readily be utilized as a basis for the designing of other structures for carrying out the invention. It is important, therefore, that the claim be regarded as including such equivalent structures as do not depart from the spirit and scope of the invention.

BRIEF DESCRIPTION OF THE DRAWINGS

Referring now to the drawings in which like reference numbers represent corresponding parts throughout.

DETAILED DESCRIPTION OF THE INVENTION

In the following description of the exemplary embodiment, reference is made to the accompanying drawings which form a part hereof, and in which is shown by way of illustration the specific embodiment in which the invention may be practiced. It is to be understood that other embodiments may be utilized as structural changes may be made without departing from the scope of the present invention.

Figure 1:
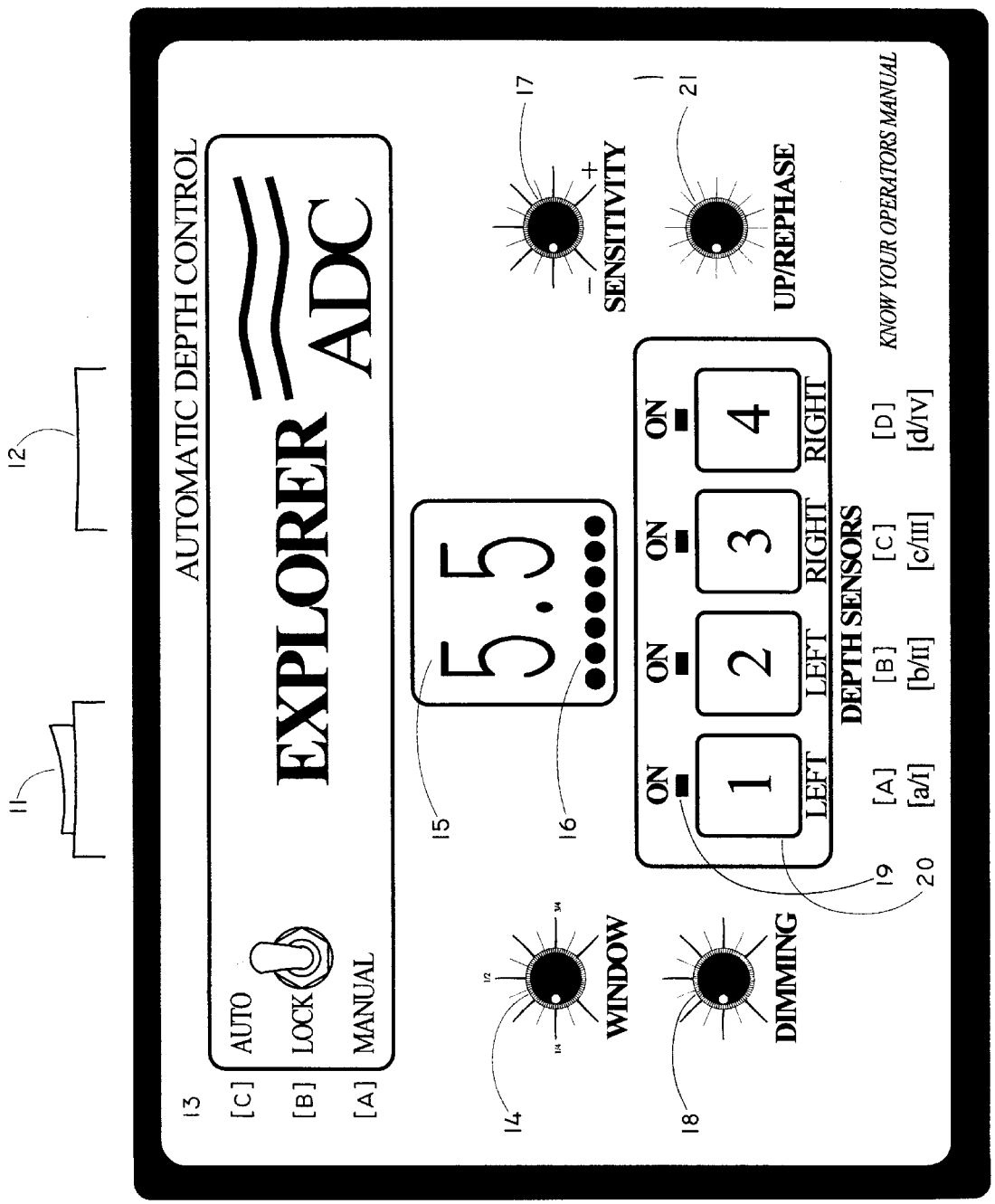
FIG. 1 illustrates a display control panel for a controller unit according to one embodiment of the present invention.

Referring to FIG. 1 of the drawing, there can be seen an embodiment of the Console. FIG. 1 shows the Console 10 with an On-off switch 11 and a 10 amp Fuse 12. A three position Console switch 13 has a MANUAL [A] mode that de-energizes all Valve solenoids and enables selective implement depth settings using manual tractor hydraulics; LOCK [B] mode that energizes certain Valve solenoids thereby blocking at the Valve all oil transfers, and placing dynamic tractor oil and flow available at the Valve for automatic Console driven oil transfers; and AUTO [C] mode which transfers control from Console to Controller, where the RUN/HOLD switch is on HOLD.

FIG. 1 further shows a WINDOW switch 14 which sets a depth window for no hydraulic correction. This depth window defines a range of depth measurements reported by the depth sensors which is centered around the desired depth in which no correction is made. An LED 15 shows the rolling average depth display. A bargraph 16 indicates deviation, outside the center light, from desired depth. A SENSITIVITY switch 17 is a time delay, one to four seconds, each second being divided into tenths of a second, between an out of depth measurement before a hydraulic correction is initiated. The combination of the WINDOW and SENSITIVITY switch settings permit a user to control the amount of hydraulic correction to be used upon conditions in the field. A DIMMER switch 18 sets the light intensity of lights on the Console. Sensor Lights 19 [A], [B], [C], and [D] indicate the four sensor lights. On-off switches 20 designated as 1 LEFT [a/i], 2 LEFT [b/ii], 3 RIGHT [c/iii] and 4 RIGHT [d/iv] activate or deactivate sensors. An Up/Rephase Switch 21 establishes the time-out for full raise (transport) time for the implement and subsequent rephasing of implement cylinders. Each mark, 1 through 15, on the Rephase Switch establishes a channel for console programming. In one embodiment, sensor lights 19A–D will blink to indicate the corresponding depth sensor indicates that a portion of the tool is not level.

Each of the above switches are shown in the embodiment shown as rotatable switches which permit a variable setting to be selected by user based upon the switches position of rotation. These switches may comprise other switch devices such as a slidable switch or a multi-position switch to achieve the same result without deviating from the scope and spirit of the present invention.

Figure 2:
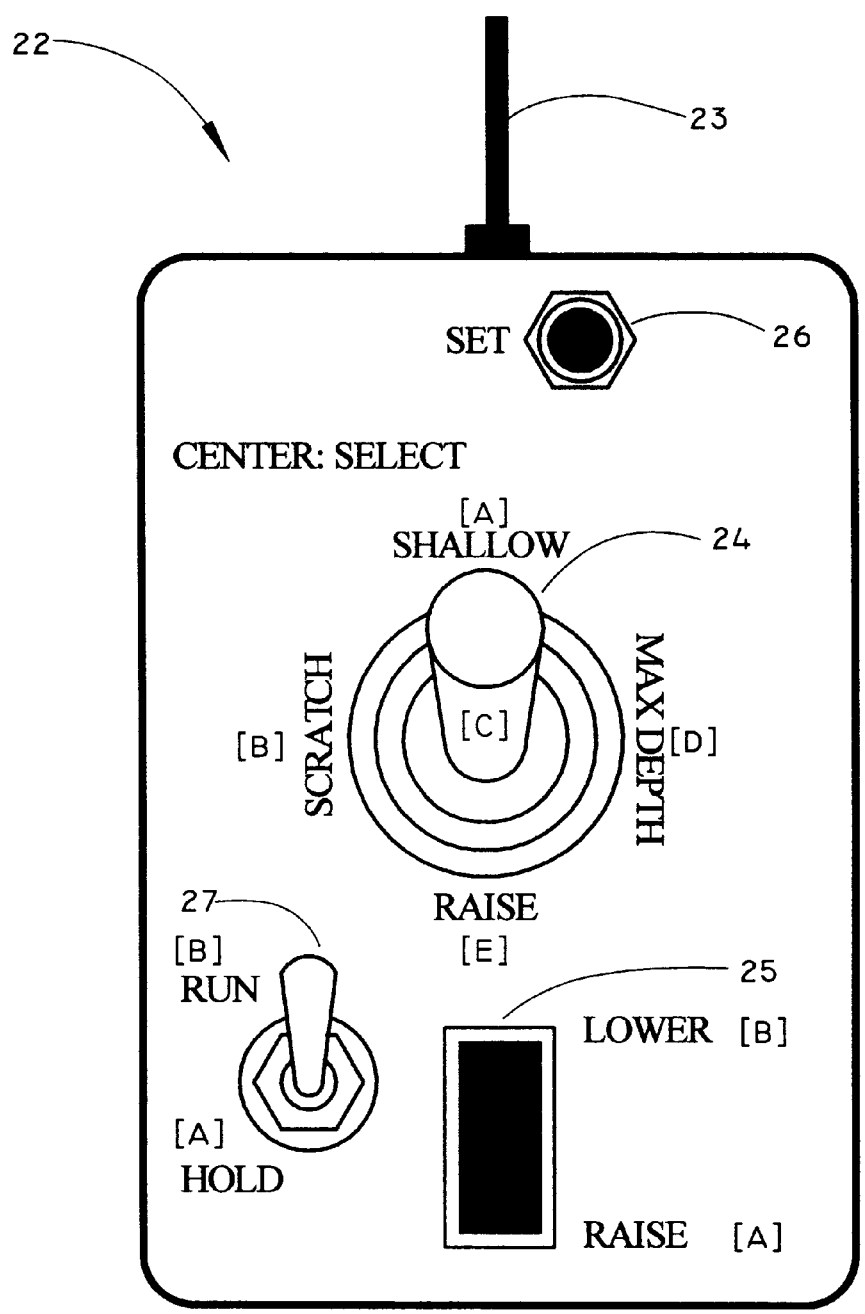
FIG. 2 illustrates a joystick input unit according to one embodiment of the present invention.

FIG. 2 shows the Controller 22 which is connected to the Console by an umbilical cord 23. A joystick 24 is a five position, mechanical detente switch with SHALLOW [A], SCRATCH [B], SELECT [C], MAX DEPTH [D], and RAISE [E] depth positions. A Rocker Switch 25, with depth setting positions of RAISE [A] and LOWER [B] sets temporary depth or depth adjustment settings in either a stationary mode or on-the-go. A Set switch 26 which sets a target depth, if pressed within two seconds, as established by the Rocker Switch into permanent memory. A Controller switch 27 which sets RUN [B] or HOLD [A].

Figure 3A:
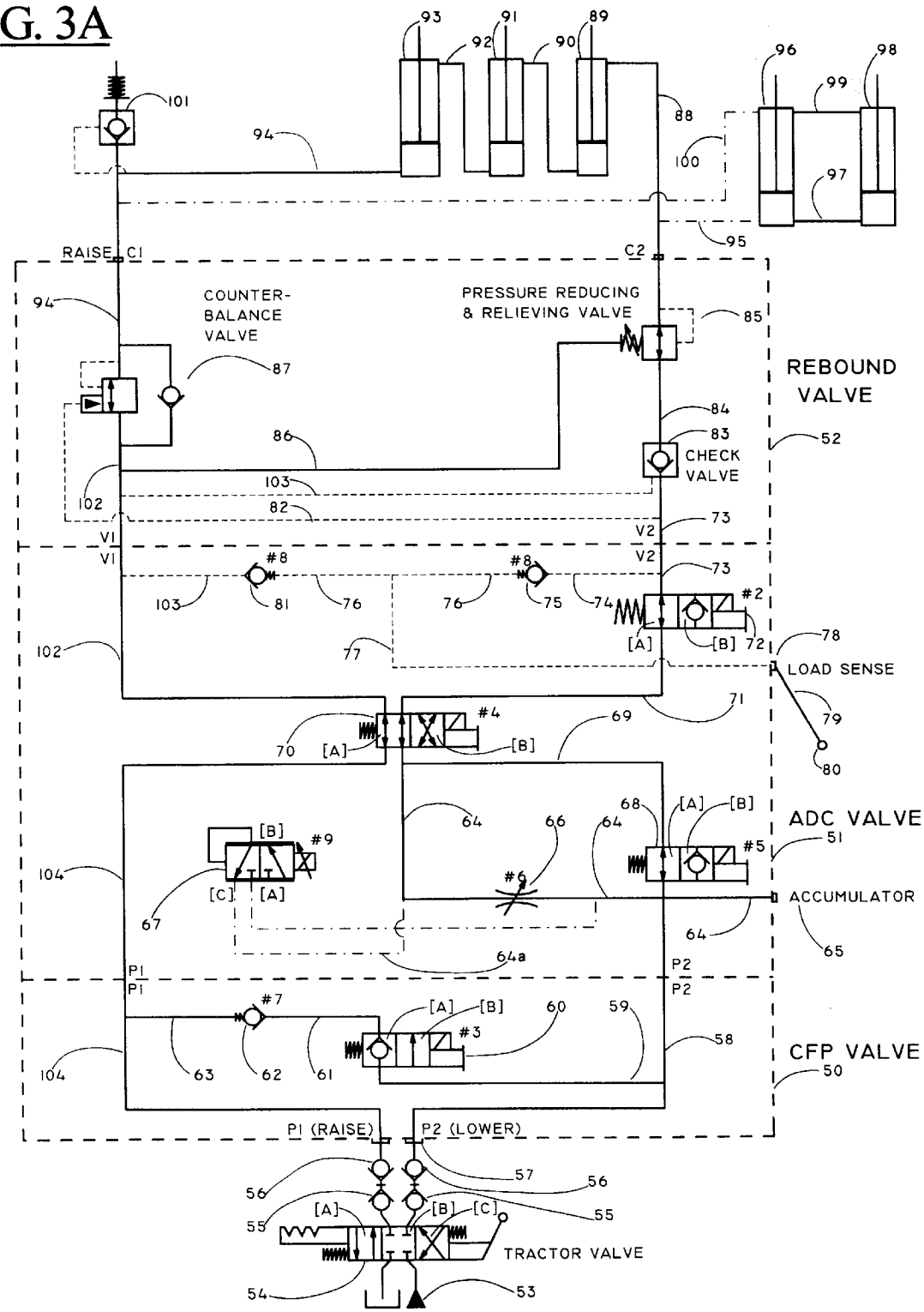
FIG. 3A–D illustrate various hydraulic systems for use in an automatic depth control system according to an embodiment of the present invention.

FIG. 3A shows three hydraulic integrated manifolds, 50, 51 and 52 with all solenoids valves de-energized. A power source 53, a four way, three position valve 54 with spool positions [A],[B] and [C], connected to a break-a-way 55. Connecting break-a-way 56 connects to port P2 57 and line 58 of manifold 50, which is an optional valve for by-pass oil flow in that it is only used for tractors having a constant flow pump; this manifold can be omitted or its cartridge ports filled with plugs. Line 58 interconnects to line 59 which connects to valve 60 (also referred to as #3), a one way, normally closed solenoid valve, with spool positions [A] and [B], which prevents flow from line 59 to line 61. Check Valve 62 prevents back pressure in line 63 from flowing into line 61. Line 58 flows to P2 Port of the CFP Valve 50 which connects to the corresponding P2 port of the Automatic Depth Control Valve 51 (ADC Valve). The CFP Valve 50 manifold is only used if the power source, e.g., tractor, has a constant flow pump, which requires a bypass function, as opposed to pressure compensated or load sensing pumps. The CFP Valve 50 and the ADC Valve 51 may either be a single integrated manifold or two separate and independent manifolds connected and secured to each other by O-rings, and bolts running through the CFP valve body and turning into the ADC Valve body.

FIG. 3A further shows that line 58 interconnects to line 64 which on one side connects to an Accumulator 65 if shock load reduction is necessary, and on the other side to either a restrictor 66 or instead optionally via inlet line 64 and outlet line 64*a*, a solenoid proportional valve 67 with spool positions [A], [B] and [C]. Optional valve 67 regulates pressure and therefore flow, for restriction, at port [B] relative to the solenoid current. If the optional valve 67 were to be used, then flow through restrictor 66 would be terminated. Line 58 also connects with valve 68, a two position, normally open solenoid valve with spool positions [A] and [B]. Valve 68 flows to valve 70, a two position, four way solenoid valve with spool positions [A] and [B] via line 69 which interconnects with line 64. Valve 70 connects with valve 72, a normally open solenoid valve with spool positions [A] and [B]. Valve 72 via line 73 interconnects to line 74 which connects to check valve 75, which connects to line 76 which interconnects to line 77 which connects to load sensing port 78, and by a third line 79 back to the tractor load sensing port 80. Line 76 also connects to check valve 81.

Line 73 flows to V2 port of the ADC Valve 51 which connects to the corresponding V2 port of the Rebound Valve 52 (RB). The ADC Valve 51 and the RB Valve 52 may either be a single integrated manifold or two separate and independent manifolds connected and secured to each other by O-rings, and bolts running through the RB Valve body and turning into the ADC Valve body.

FIG. 3A further shows line 73 interconnects to pilot line 82 of Counter-balance valve 87 and connects with check valve 83 which connects via line 84 to Pressure Reducing and Relieving Valve 85 (PR&R). PR&R Valve 85 connects to drain/pilot line 86 and to reduced pressure line 88 to series cylinder 89 via line 90 to series cylinder 91 via line 92 to series cylinder 93 a typical series cylinder set, via line 94 to C1 port of RB Valve 52.

FIG. 3A also shows a parallel series cylinder set as optional to a straight series cylinder set. In this option, line 88 connects to line 95 which connects to the piston side of cylinder 96. Line 97 connects cylinder 96 to the piston side of cylinder 98. Line 99 connects the rod side of cylinder 98 to the rod side of cylinder 96. Line 100 connects cylinder 96 to line 94 typically using a torque tube to synchronize the parallel cylinders. Also shown is an option single point hydraulic stroke control valve 101 which controls the retraction of a set of series cylinders or parallel series cylinders. A single point hydraulic stroke control valve can also be replaced by collars attached to the rod of a cylinder in order to control the retraction of the cylinder(s).

FIG. 3A further shows line 94 connecting to Counter-Balance Valve 87. Line 102 interconnects to drain/pilot line 86 of PR&R Valve 85 and pilot line 103 of Check Valve 83. Line 102 flows to V1 port of the RB Valve 52 which connects to the corresponding V1 port of the ADC Valve 51. Line 102 further continues to intersect line 103 which connects to check valve 81 and connects via line 76 and 77 to Load Sense port 78 which connects to the tractor load sensing port 80 via line 79. Line 102 continues from the intersection of line 103 to the [A] spool position of valve 70. From valve 70, line 104 connects to the P1 port of the ADC Valve 51 which connects to the corresponding P1 port of the CFP Valve 50. Line 104 continues and intersect with line 63 of the CFP Valve. From the intersection with line 63, line 104 connects with P1 port (Raise) which connects to break-a-ways 56 and 55, valving 54 and power supply 53.

Figure 3B:
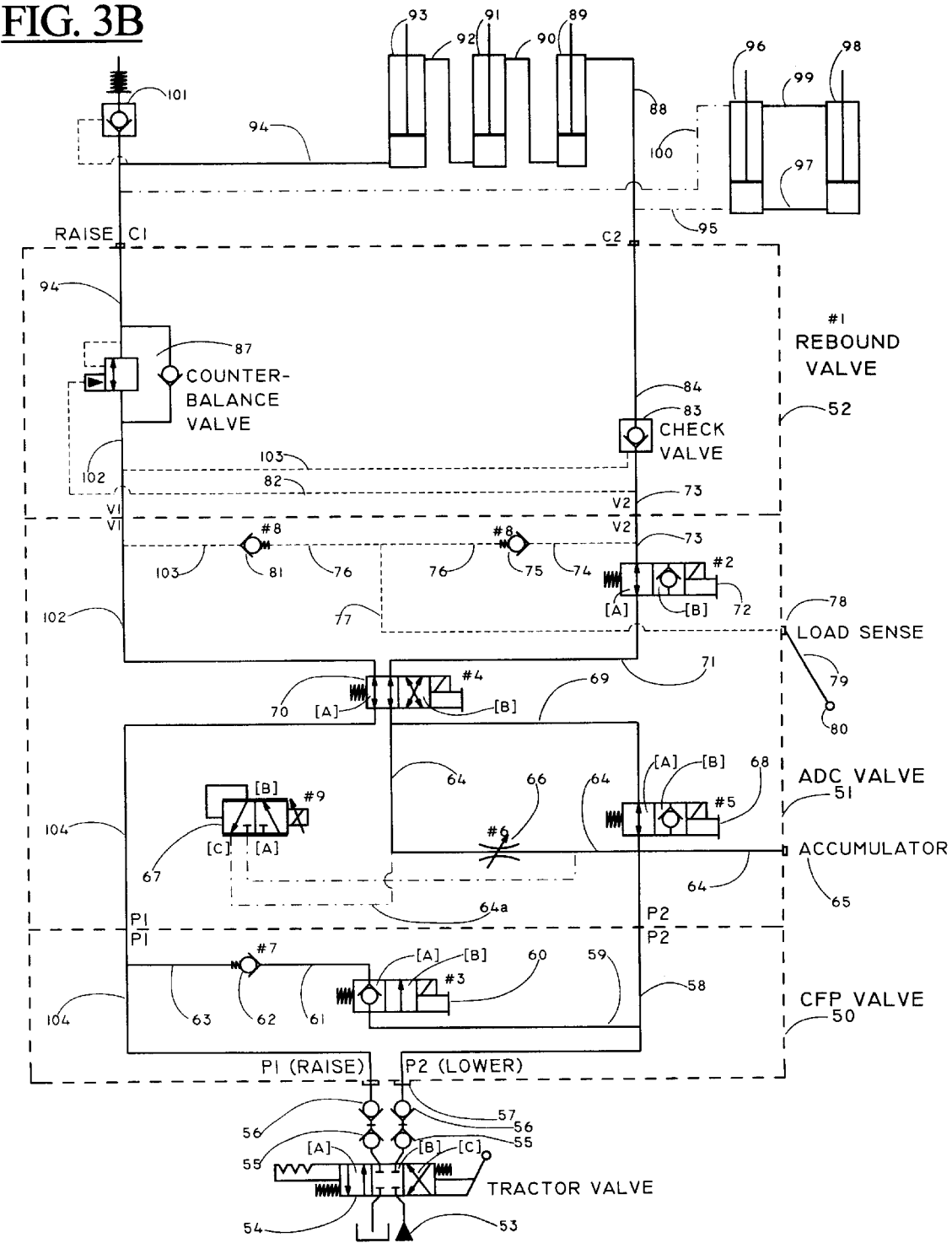

FIG. 3B illustrates an alternate embodiment of the hydraulic system according to the present invention in which the pressure reducing valve 85 and has been removed. In all other respects, this less preferred embodiment operates in the manner described above. However, FIG. 3B, this alternate embodiment, has an inherent weakness in that it does not address the problems of compression and de-compression, and draft relief; nor provides a relief for extensive pressure build-up when used in conjunction with mechanical devices limiting stroke of a hydraulic cylinder.

Figure 3C:
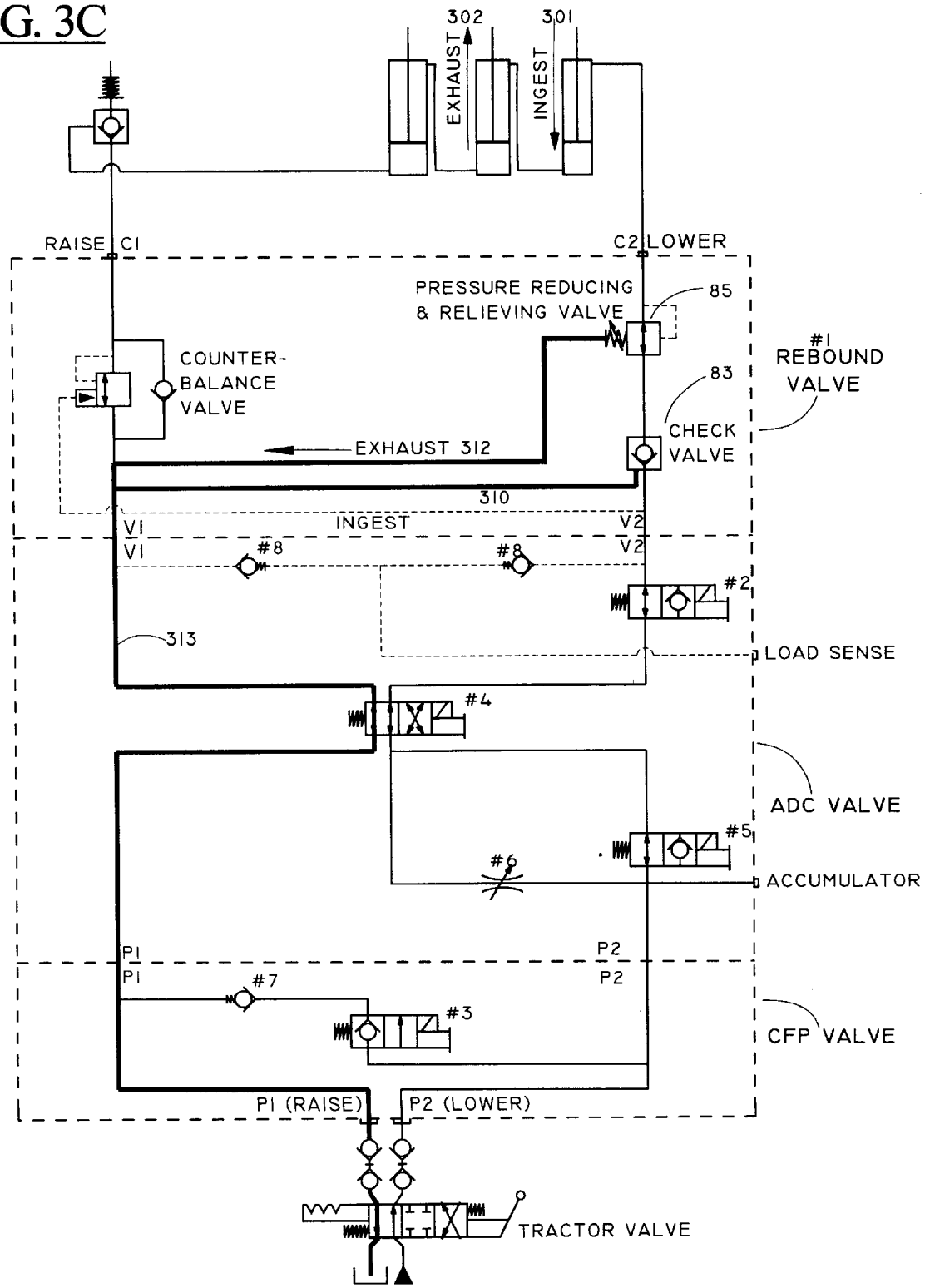

FIG. 3C illustrates the operation of the hydraulic system according to a preferred embodiment of the present invention discussed above. During operation, when no hydraulic corrections are underway, the series cylinders can retract 301 from draft forces. The cylinders ingest oil from the tractor oil reservoir via line 313 and 310, freely flowing through the check valve 83 and PR and RV 85. Upon relief of the draft forces, the series cylinders re-extend 302, exhausting oil at a controlled rate of 15 to 20 cubic inches per minute which dampens the effects of draft relief through the PR and RV 85 via line 312 and 313, returning to the oil reservoir. Oil line 313 is always open to the ingest and exhaust of oil when the hydraulic circuit is in automatic mode.

Figure 3D:
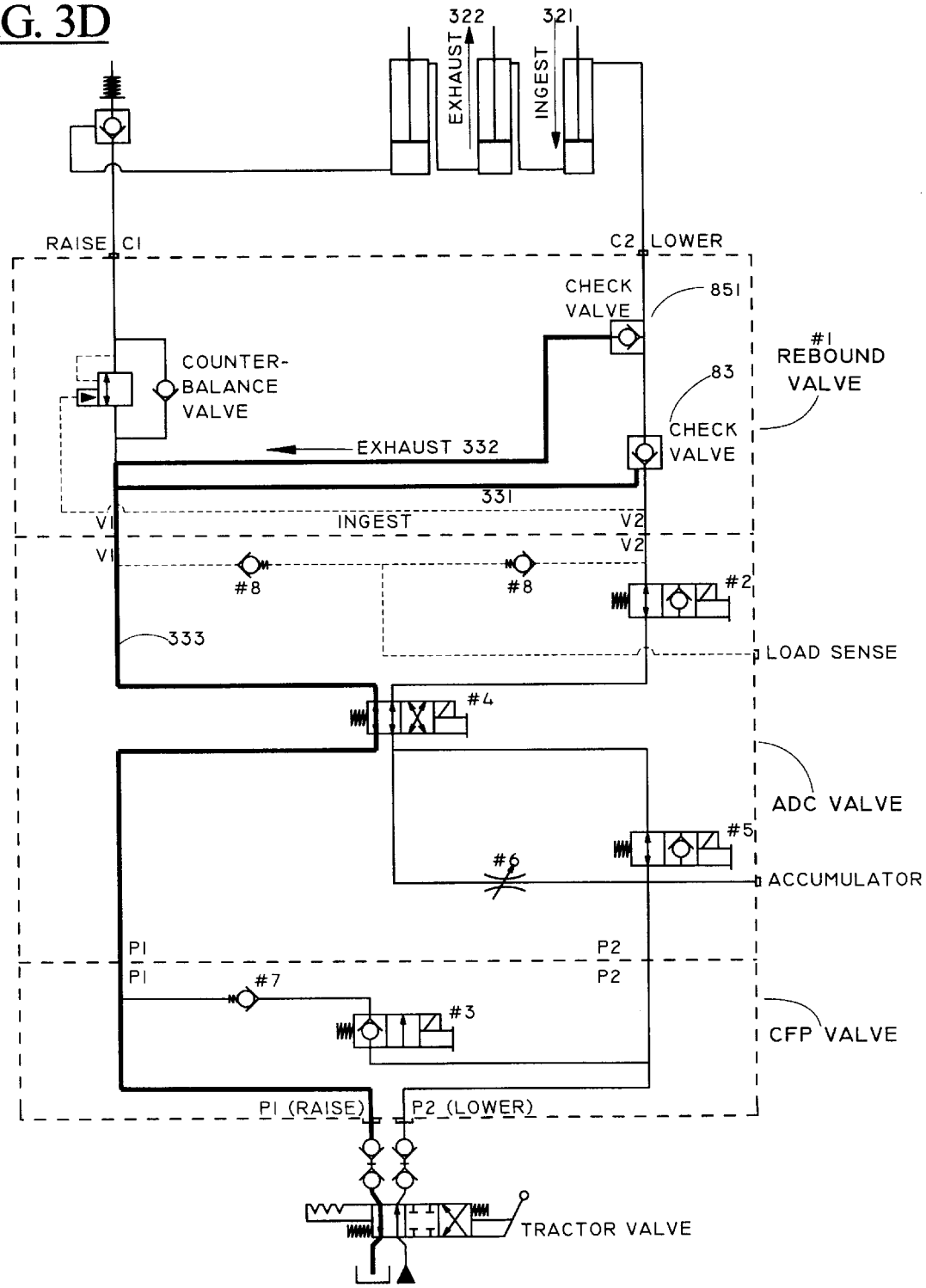

FIG. 3D illustrates the operation of the hydraulic system according to another embodiment of the present invention. According to this embodiment, valve 85 has been replaced with check valve 851. The operation of the system is again controlled by ingest 321 and exhaust 322. However, FIG. 3D, this alternate embodiment, has an inherent weakness in that it does not enable the release of detente in the tractor valve during mechanical operation, it back pressures the counter balance valve and single point hydraulic stroke control and results in the hydraulic circuitry not having positive flow channels. The relief valve does not control discharge gpm via line 332 and therefore does not efficiently control the effects of draft relief.

Figure 4:
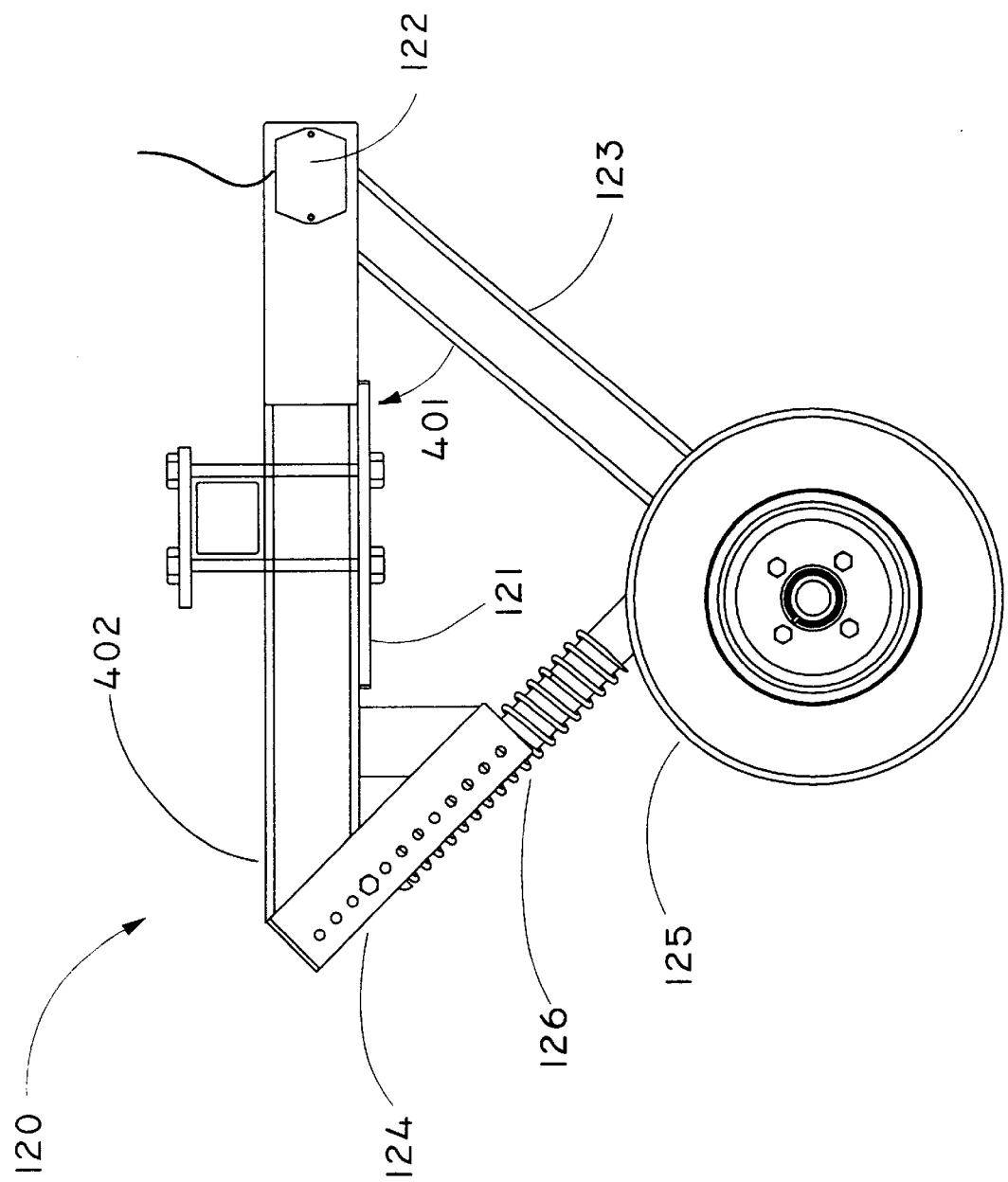
FIG. 4 illustrates potentiometer- based depth sensor system according to one embodiment of the present invention.

FIG. 4 shows a depth gauge wheel assembly 120 having an inverted pyramid arrangement, as an integral depth sensing part of the invention, having a bracket plate 121 coupled to a horizontal support member 402, the bracket plate having variable hole spacing by which the assembly 120 is fastened to an implement, typically using U-bolts or a bolt plate. A potentiometer assembly 122, shown in more detail in FIG. 5, senses the angle 401 between the implement frame and the wheel leg extension 123 in order to determine the height of the frame above the ground. A two piece bracket/bolt assembly 124 adjusts and secures the assembly which includes wheel 125 so that the assembly is under tension when the implement tools are just touching the ground surface. A shock absorber 126 assembly provides tension to the assembly and dampens shock loads from uneven ground, clumps of dirt and mulch. The assembly 120 can be mounted either above or below the frame.

Figure 5:
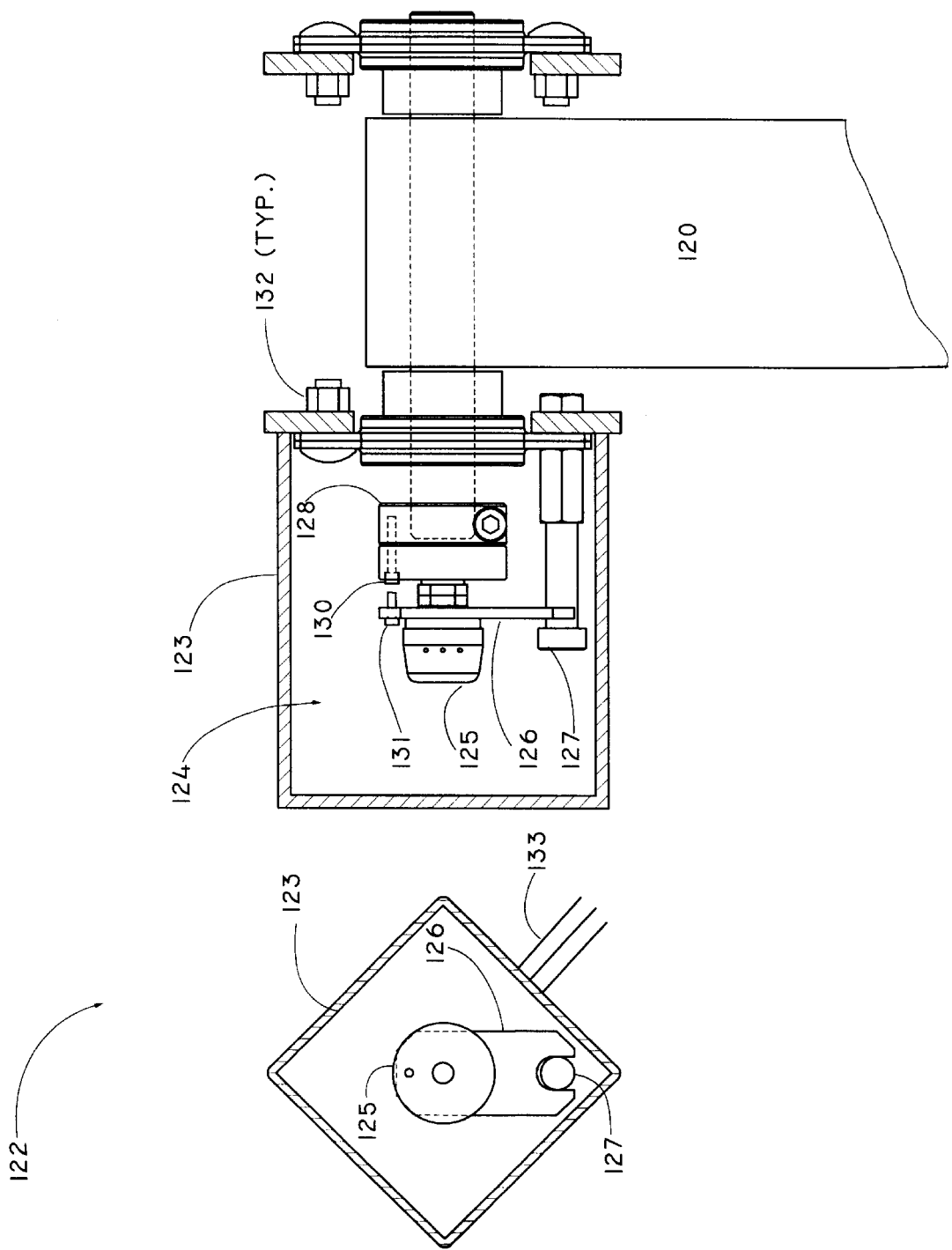
FIG. 5 illustrates one potentiometer system according to another embodiment of the present invention.

FIG. 5 shows the potentiometer assembly 122 which incorporates the axle and bearing assembly of depth gauge wheel assembly 120. A protective housing covers the potentiometer assembly 124 which includes a potentiometer 125, a potentiometer set arm 126 and a bolt assembly 127 to secure arm 126. Once assembly 120 is under correct positioning, then assembly 128 is secured by bolt 129 and bolt 130 is aligned opposite bolt 131. Bolts 132 secure the non-moving bracket assembly 121 to the axle bearing assembly 120. The electrical grip cord 133 carries the potentiometer 125 voltage signal, that angle between implement frame and wheel assembly 120, to the Console. The depth of the tool can thus be determined from the measured angle of the sensor. Alternatively, the controller can adjust the operation of the hydraulic system using a measured angle in place of a depth measurement. Because of the geometry of the assembly shown in FIG. 4, the angle measured corresponds directly to the depth of the tool.

Figure 6:
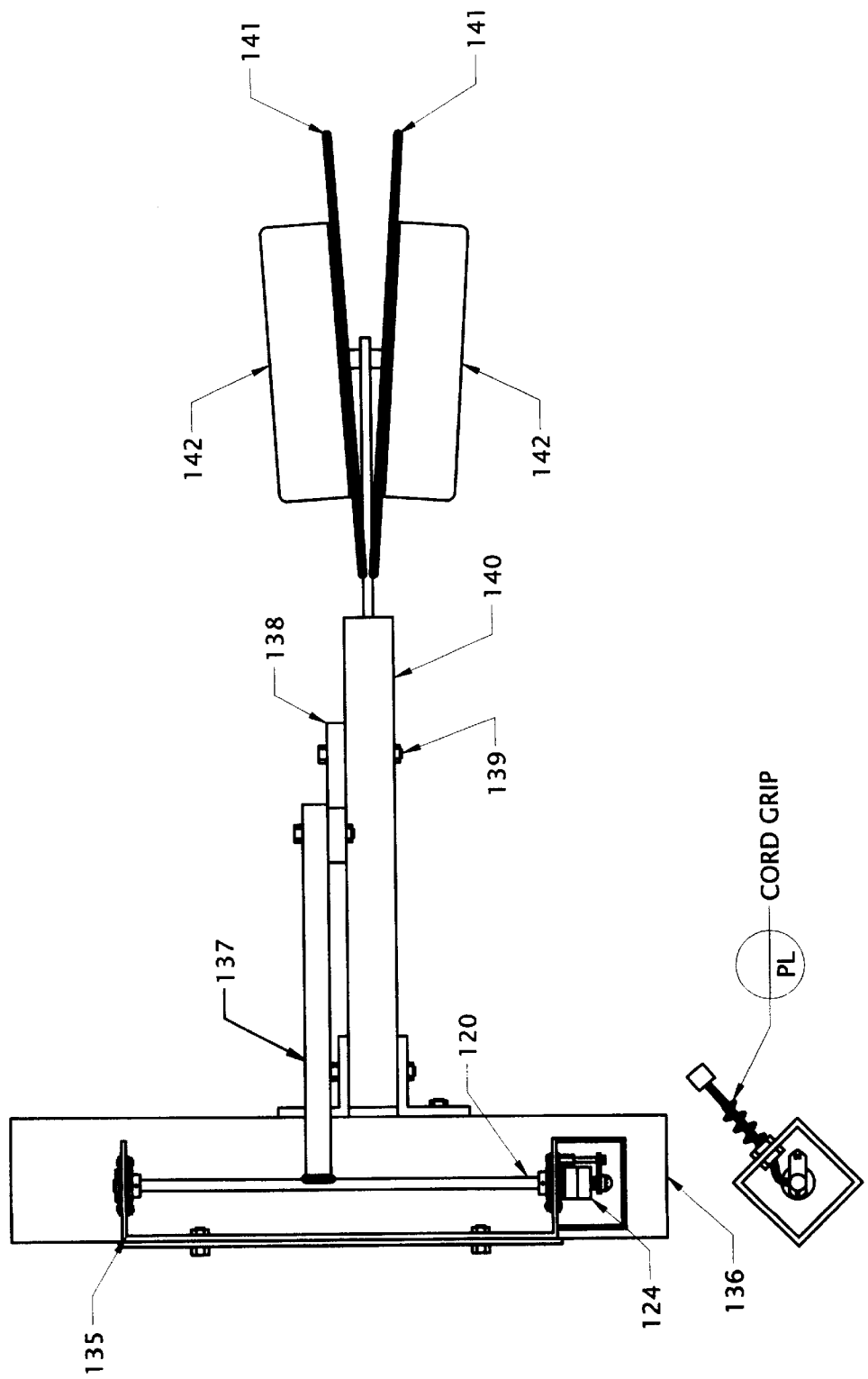
FIG. 6 illustrates a bracket assembly relating to a grain drill according to another embodiment of the present invention.

FIG. 6 shows a bracket assembly 135, in another integral sensing part of the invention applicable to grain drills, mounted to the frame 136 of a typical grain drill, with bearing and axle assembly 120 and potentiometer assembly 124. Instead of a wheel leg extension 123 and shock absorber 126 assembly, an arm 137 is welded to axle 120. Arm 137 incorporates a hinged arm 138 attached to cross arm 139 of grain drill seed arm assembly 140. Assembly 140 typically includes a double disk opener 141 and a depth gauge wheel or packer wheel 142, which would locate behind the disk opener 141.

Figure 7:
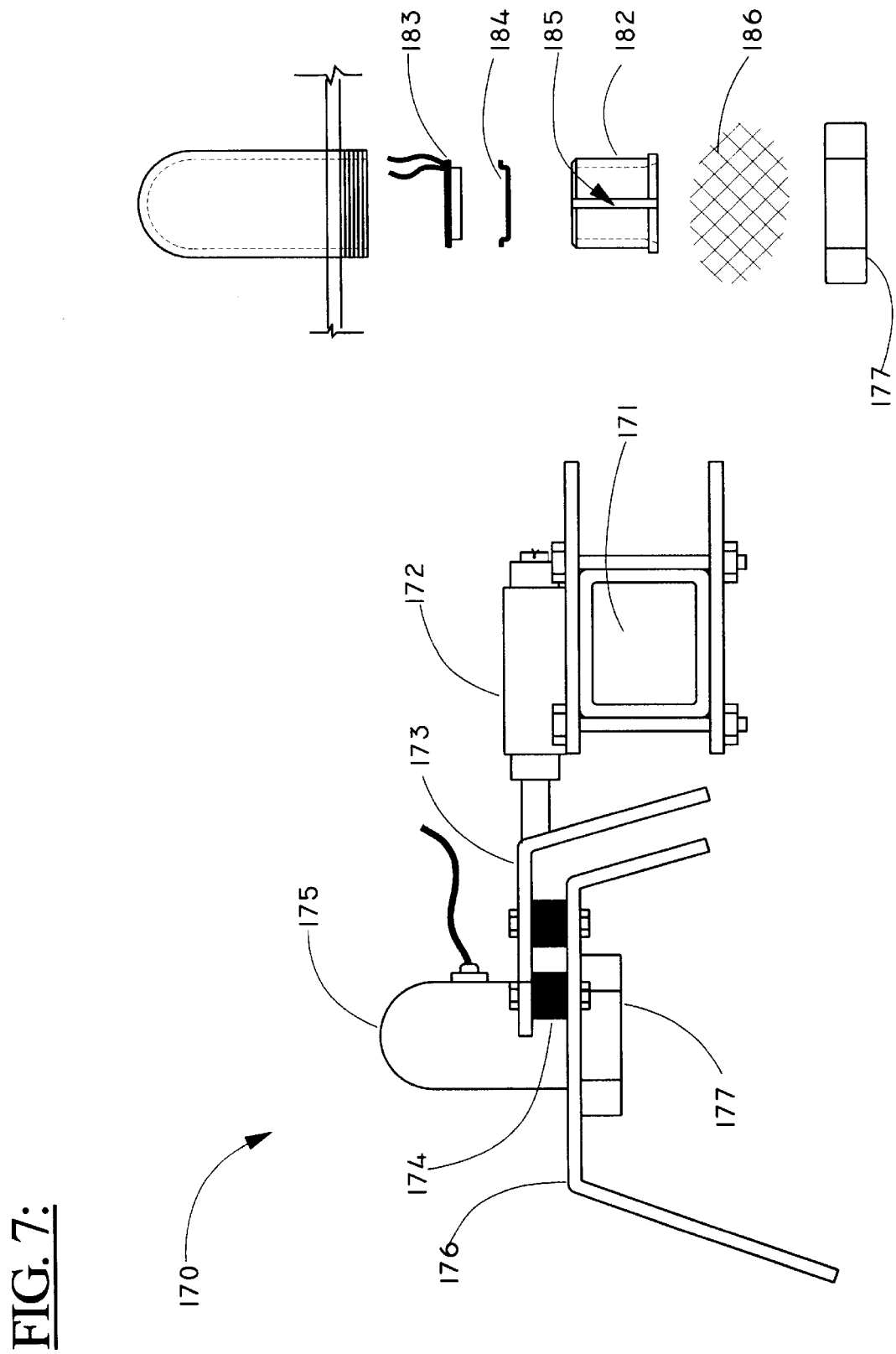
FIG. 7 illustrates an ultrasonic transducer mounting system according to one embodiment of the present invention.

FIG. 7 shows the ultrasonic transducer 170 which is attached to the frame 171 of the implement. The ultrasonic transducer may be used in addition to, or in place of, the potentiometer sensor for obtaining depth measurements of the tool. The transducer generates a signal which is transmitted to the controller that is proportional to the distance between the transducer mounted on the frame and the ground. In one particular embodiment, this tranducer element comprises a tranducer manufactured by Senix Corp., of Bristol, Vt., Model No. UA-TR-ENU. By measuring this signal, the controller may obtain a measure of the depth of a tool in the soil. A swivel housing 172 mounts on the implement frame. A swivel bracket 173 extends outward onto which is attached rubber mounts 174 for the transducer assembly 175. Rubber mounts 174 provide give for sensor clearance on an implement plugged by mulch. The farmer backs up the implement to discharge the plug and then drives back over the plug to spread it. Transducer housing guard 176 protects against mulch entering the housing. The hinge bracket or swivel 173, which permits the transducer housing to always point toward the ground such as when an implement wing is raised, is attached to bracket 176 and the housing cap 177 of transducer housing 175. Cap 177 permits the removal of transducer insert 182. The transducer insert 182 holds the transducer 183, an optional protective covering 184, such as Union Ocean Guard material, for the transducer face, and a venting port 185 and an optional protective grill 186 of approximately ¼×¼ grid.

Figure 8:
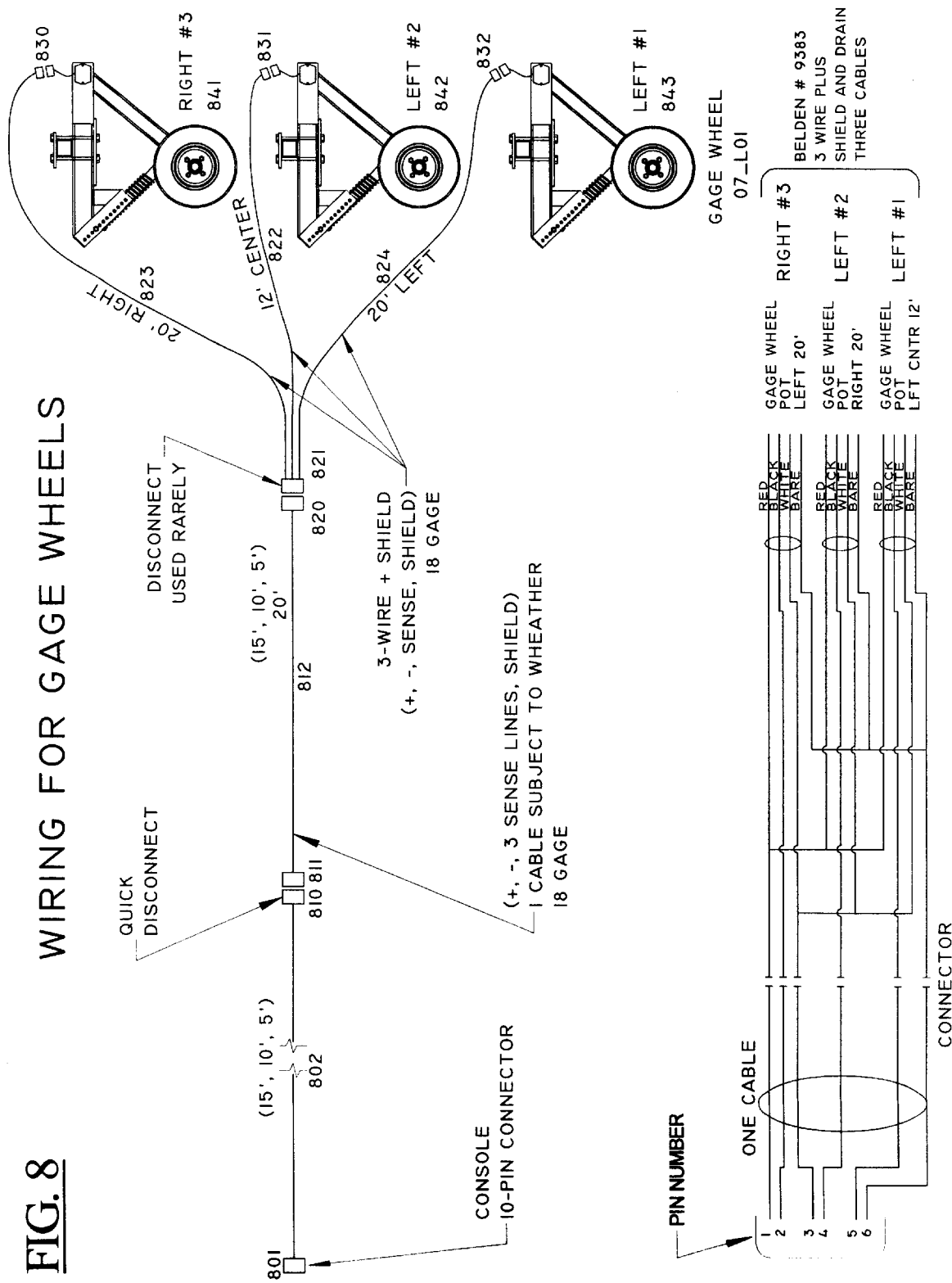
FIG. 8 illustrates a wring diagram for gauge wheels according to one embodiment of the present invention.

FIG. 8 illustrates a wiring diagram for gauge wheels potentiometer based sensors (841–843). This wiring harness consists of three segments. The first segment 802 runs between the Console unit and connector 801 and an intermediate quick disconnect 810. The second segment 812 runs from a quick disconnect 811, which mates with quick disconnect 810, and disconnect 820. A third segment comprises three separate links 822, 823, and 824 which run between quick disconnect 821 and three separate connectors 830, 831, and 832. Disconnect 821 mates with disconnect 820 to complete the length from Console unit to each of the potentiometers.

Figure 9:
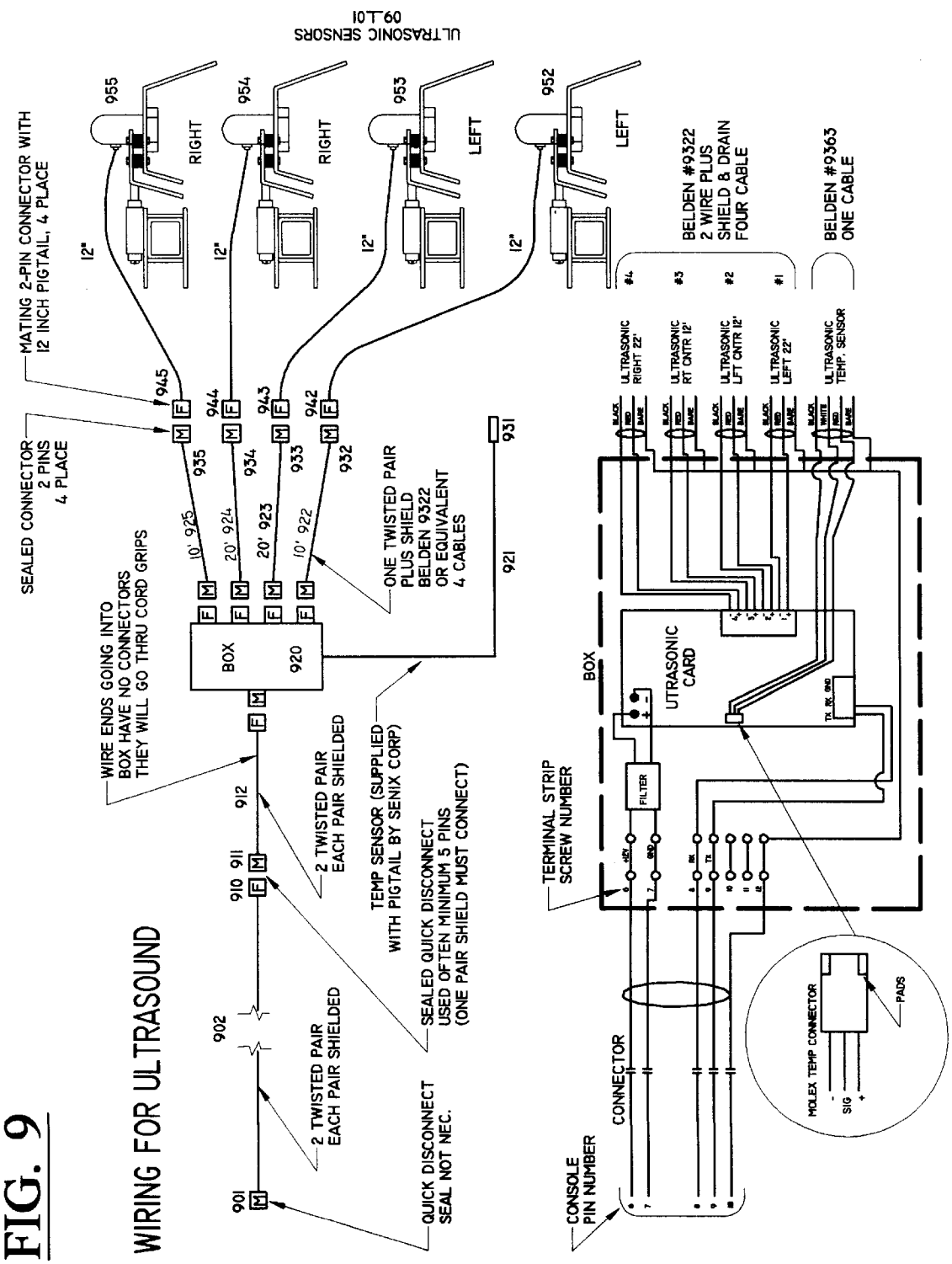
FIG. 9 illustrates a wiring diagram for ultrasonic transducers according to one embodiment of the present invention.

FIG. 9 illustrates a wiring diagram for the ultrasonic sensor system according to one embodiment of the present invention. The first of several wiring harnesses 902 runs between a quick disconnect 901 and a quick disconnect 910. The quick disconnect 901 interfaces with the Console unit of the controller.

The second segment of this wiring harness 912 runs between quick disconnect 911 and control box 920. Quick disconnect 911 connects with quick disconnect 910 on the first segment 902 to connect the Console with the ultrasonic control box 920.

A series of connections run from the control box 920 to each of the ultrasonic transducers (952–955). The first of these connections 921 run between the control box 920 and a temperature sensor 931. A plurality of additional connections 922–925 run between the control box 920 and a series of mating connectors 932–935. These run control signals out from a control box towards the transducers. The transducers are attached to disconnects 942–945 providing a direct connection from these transducers all the way into the control box.

Figure 10:
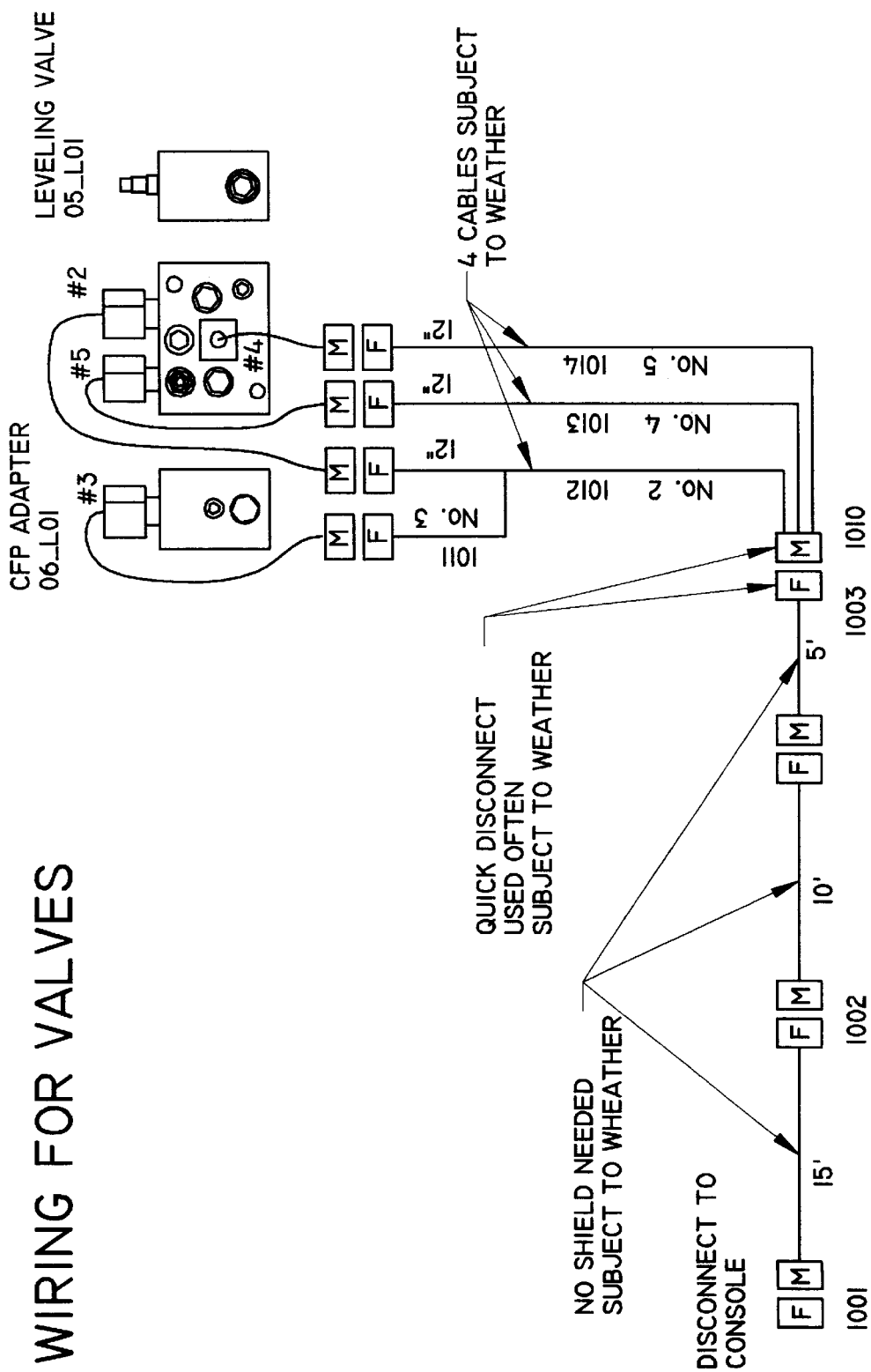
FIG. 10 illustrates a wiring diagram for a hydraulic system according to one embodiment of the present invention.

FIG. 10 illustrates a wiring diagram for the hydraulic valving according to one embodiment of the present invention. The wiring harness consists of a first segment 1002 which runs between quick disconnect 1001 and intermediate connect 1003. The 1001 connector connects to the Console unit to connect the controller to the hydraulic wiring harness. A second wiring segment comprising a plurality of connections 1011–1014 runs between quick disconnect 1010 and each of the valves themselves. Disconnect 1010 connects to disconnect 1003 for connecting the wiring harness from the Console to the valves themselves. The controller within the Console effectuates operation of the individual valves by sending control signals down this harness to each of the valves individually.

Figure 11:
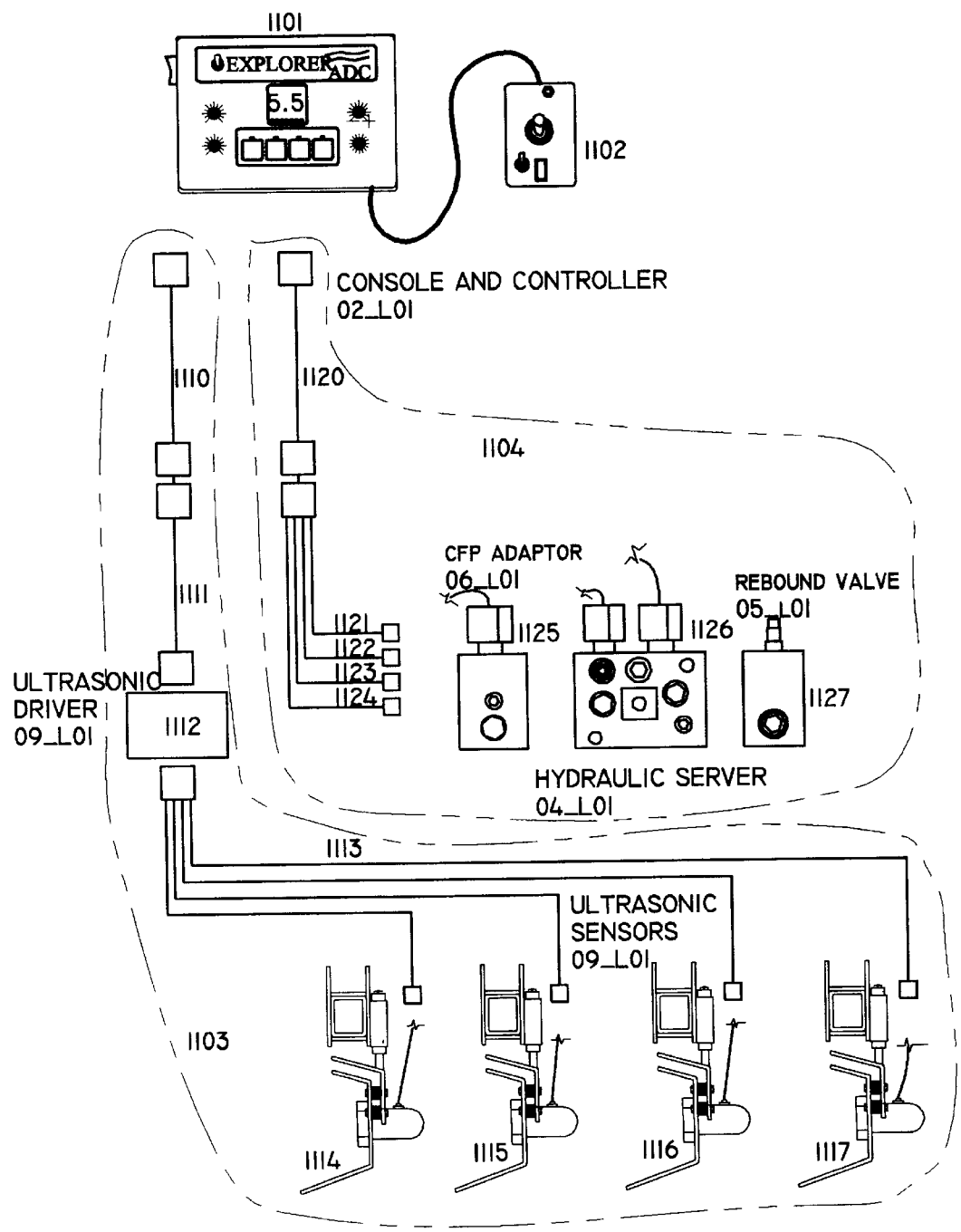
FIG. 11 illustrates a system block diagram for an ultrasonic-based automatic depth control system according to another embodiment of the present invention.

FIG. 11 illustrates a block diagram of the complete depth control system according to one embodiment in the present invention. The system consists of the Console controller 1101 and its corresponding user operated joystick 1102. The Console and its controller are connected to ultrasonic sensor system 1103 and a hydraulic subsystem 1104. The ultrasonic subsystem 1103 comprises three wiring segments 1110, 1111, and 1113, the ultrasonic drive control unit 1112, and a plurality of ultrasonic sensors 1114–1117. The wiring connection for this subsystem corresponds to the wiring shown in FIG. 9 discussed above.

The hydraulic subsystem comprises a plurality of wiring harnesses 1120–1124, a CFP adapter 1125, a hydraulic server 1126, and rebound valve 1127. The wiring connections for the hydraulic subsystem 1104 correspond to the wiring shown previously in FIG. 10.

The controller contained with Console 1101 comprises electronics support or microprocessor based subsystem running software which obtains depth measurements from the ultrasonic sensors 1114–1117 on a periodic basis and adjusts the depth of the implement using the hydraulic subsystem 1104. The ultrasonic subsystem 1103 could, in fact, be replaced by the potentiometer base system using the gauge wheels as shown in FIG. 4 and 8 respectively.

SET-UP OPERATION

The Set-Up operation of system FIG. 1 and FIG. 2 is explained as follows:

a. With the implement connected to the tractor, tractor with the engine running, use the tractor hydraulics 53–54 to place the implement in the raised or transport position, and then return the tractor hydraulic lever 54 in the neutral position.

b. Turn Console 10 to the switch 11 "ON" position and move the Console Toggle 13 to the MANUAL [A] position which de-energizes valves 60, 68, 70 and 72. The LED 15 shows "H.H" if the Controller 22 toggle switch 27 is not on HOLD [A]; the LED 15 shows a negative number, e.g. "–9" showing height above the surface if the Controller 22 toggle switch 27 is on HOLD [A]. This is a safety step and the ADS will not set up functions unless switch 27 is on HOLD [A].

c. Press applicable DEPTH SENSOR switches 20, [a], [b], [c] and [d], to activate sensors. Applicable LEDs 19, [A], [B], [C] and [D] will light to show sensors are activated.

d. Lower tillage tool just onto the ground surface and establish surface as a permanent memory reference (actual ground zero for tool replacement) by pressing the SET button for ten (10) seconds (ten is programmable). LED will flash 0.0 twice as permanent set point signal. All depth settings SHALLOW, SCRATCH, and SELECT are relative to reference "SURFACE."

e. Move the Controller 22 joystick 24 to the SCRATCH (B) depth position. Use the Rocker Switch 25 to choose a working SCRATCH (B) depth; e.g., a depth of 0.5 inches to till, for example, wet ground only 0.5 inches deep so it starts to dry but does not chunk. Press and hold the SET 26 button within two seconds. The LED will read "0.5" and the SCRATCH setting is now in permanent memory.

f. Move the Controller 22 joystick 24 to the Shallow [A] depth position. Use the Rocker Switch 25 to choose a working SHALLOW [A] depth; e.g., a depth of 1.5 inches to erase the tractor tire lug marks on a 180 degree turn at the end of a field. Press and hold the Set 26 button within two seconds. The LED 15 will read "1.5" and the SHALLOW setting is now in permanent memory.

g. Move the Controller 22 joystick 24 to the SELECT [C] depth position. Use the Rocker Switch 25 to choose a working SELECT [C] depth; e.g., a depth of 3.5 inches which is the depth at which the field may be tilled. Press and hold the Set 26 button within two seconds. The LED 15 will read "3.5" and the SELECT setting is now in permanent memory.

h. RAISE [E] is an automatic position and will place the implement in the raise or transport position. It is also a position for rephasing of cylinders, a cylinder rod position which removes air from the hydraulic circuitry.

i. MAX [D] is an automatic position and will place the implement in the deepest tillage possible, either onto depth stops or to full cylinder rod retraction. There is a timed sequence for dynamic hydraulics.

j. Use the WINDOW 14 rotary switch to select an underground spread in which no hydraulic corrections will be made; e.g., ½ inch would provide a depth window, plus or minus ¼ inch, before a hydraulic correct would take place. Each light from center is always ½ of the previous variation.

k. Use the SENSITIVITY 17 rotary switch to set the time delay for hydraulic correction; e.g., if a variation of depth outside the Window restriction of ½ inch does not remain outside ½ inch for an example period of time of (1) second, approx. 10 feet at 7 mph, no hydraulic correction would take place. Also, if the sensors showed a depth variation outside the WINDOW for less than one second (example), but a return inside the Window within the second, then no hydraulic correction would take place.

l. Use the rotary dial Up-Rephase 22 to select the time required to fully raise the carrier cylinders, either series or parallel series; plus rephase series cylinders to exhaust any air trapped in the system. This is a time sequence for dynamic hydraulics.

FIELD OPERATION

Surface, Scratch Shallow and Select depth values are in permanent memory from the set-up operation.

a. Turn the Console 10 to the switch 11 "On" position. SURFACE, SCRATCH SHALLOW and SELECT; e.g., "0.0", "0.5", "1.5" and "3.5" will be displayed in sequence, each two times, then depressed within two seconds within the sequence.

b. Place the Console Toggle switch 13 on LOCK [B] (the Controller toggle 27 must be on HOLD [A] or the LED 15 will read "H.H" and functions cannot start—a safety feature).

c. Press each applicable DEPTH SENSORS 19 switch [a], [b], [c], and [d] to activate applicable sensors. LED 15 will display averaged depth, or display "-.-" for a position above ground, or "9.9" for a position 9.9 inches deep or deeper.

d. With Console toggle 13 on LOCK [B] and Controller toggle 27 on HOLD [A], secure tractor hydraulic valve 54 in spool position [A] to provide dynamic pressure to P2. Move Console toggle switch 13 from LOCK [B] to AUTO [C]. The Controller 22 now controls the automatic operation.

e. Controller 22—Set joystick 24 to either RAISE, SHALLOW or SELECT. The tractor is in gear and moving. Move Controller toggle 27 from HOLD [A] to RUN [B] and the implement will go to the depth indicated by joystick 24 detent setting. Moving the joystick 24, on-the-go, to any one of the detent positions and hydraulics will actuate the cylinders to reach this depth or raise position.

f. The MAX [D] is a special, maximum depth setting and must be deeper than Select [C] depth. It moves cylinders in a retract mode to the deepest tillage setting of the implement, either onto a single point hydraulic depth control stop, mechanical depth stops or to full retraction of the cylinders.

g. The Rocker Switch 25 is a special depth setting function in that it overrides all depth settings except HOLD 27[A]. Rocker switch 25 depth changes go into temporary memory. To place the new depth setting into permanent memory press and hold the Controller 22 Set Button 26 within two seconds. If Set Button 26 is not actuated than any temporary memory of the Rocker Switch 25 will cancel upon the joystick 24 being moved to another position.

| POWER BEYOND VALVE SEQUENCE | | |
| --- | --- | --- |
| Function | Mode | Valve(s) Energized | Patent Valve Number |
| MANUAL | No. 1 | None | None |
| LOCK & HOLD | No. 2 | #2 & #3 | 60 & 72 |
| RAISE | No. 3 | #4 | 70 |
| RAISE to tillage | No. 4 | None | None |
| Raise-incremental | No. 5 | #4 & #5(#9) | 70 & 68(67) |

-continued

POWER BEYOND VALVE SEQUENCE

| Function | Mode | Valve(s) Energized | Patent Valve Number |
|---|---|---|---|
| Lower-incremental | No. 6 | #5(#9) | 68(67) |
| Raise by Rocker Switch | No. 5 | #4 & #5(#9) | 70 & 68(67) |
| Lower by Rocker Switch | No. 6 | #5(#9) | 68(67) |
| MECHANICAL | No. 7 | None | None |

Between all modes, there is restricted flow, microprocessor adjusted, by $\frac{1}{10}$ of a second periods to prevent overshooting and/or undershooting of the WINDOW. When tool penetration enters the Window spread, Mode #2 secures the depth. Mechanical depth is always full flow hydraulics with dynamic pressure holding for typically 6 sec from SURFACE, 4 sec from SHALLOW, and 3 sec from SELECT. After this time elapse, Mode #2 secures the depth.

Here is given a typical field tillage operation addressing variable soil conditions. With a power source such as a tractor, pulling a trailing implement such as a cultivator, the following sequences of automatic depth control would take place through interaction of the Console, Controller, Power Beyond Valving, Gauge Wheels or Ultrasonics. A person versed in hydraulics can readily follow the hydraulic circuitry. The Console 10 is on and set and the Controller 23 has control of the automatic mode.

1. The joystick 24 is moved from RAISE [E] to SELECT [C], a depth of 3.5". Mode No. 4 lowers, Mode No. 6 slows, and Mode No. 2 secures 3.5"
2. The joystick 24 is moved from SELECT [C] to SHALLOW [A], a depth of 1.5". Mode No. 3 raises, Mode No. 5 slows, and Mode No. 2 secures 1.5".
3. The joystick 24 is moved from SHALLOW [A] to SELECT [C], a depth of 3.5". Mode No. 4 lowers, Mode No. 6 slows, and Mode No. 2 secures 3.5".
4. The joystick 24 is moved from SELECT [C] to SCRATCH [B], a depth of 0.5". Mode No. 3 raises, Mode No. 5 slows, and Mode No. 2 secures 0.5".
5. The joystick 24 is moved from SCRATCH [B] to SELECT [C], a depth of 3.5". Mode No. 4 lowers, Mode No. 6 slows, and Mode No. 2 secures 3.5".
6. The Rocker Switch 25 changes SELECT [C] depth to 3". Mode No. 5 changes depth to 3" at one click for each $\frac{1}{10}$".
7. The joystick 24 is moved from SELECT [C] to MAX DEPTH [D]. Mode No. 7 lowers implement onto mechanical stop devices. Hydraulic pressure remains dynamic in lowering mode for timed seconds.
8. The joystick 24 is moved from MAX DEPTH [D] to RAISE [E]. Mode No. 3 raises implement to full raise—transport position. Hydraulic pressure remains dynamic for time set on UP/REPHASE 21.

FIELD SHUT DOWN

1. Move joystick 24 to RAISE [E]—this places implement in the transport mode
2. Move Controller toggle 27 switch to HOLD [A]
3. Move Console Toggle 13 to LOCK [B]
4. Center hydraulic valve 54 to spool position [B]
5. Switch Console 10 switch 11 to Off All values set in permanent memory remain in permanent memory; therefore, it is mandatory that SURFACE always be an accurate value. Every time an operator enters a field, he should feel obligated to verify the SURFACE setting.

MANUAL OPERATION

There may be times or circumstances when it is desirable to run in a manual operation. The automatic depth control system will give depth reading, if Console 10 switch 11 is "On" and appropriate DEPTH SENSORS 19, [a], [b], [c] and [d] are on, but all hydraulic functions will be made by the operator.

1. Move Controller toggle 27 to HOLD [A]
2. Center hydraulic valve 54, spool [B] position
3. Move Console toggle 13 to MANUAL [A]
4. Use hydraulic valve 54 for manual adjustments of tool penetration.

CONSOLE CONTROLLER

Figure 12:
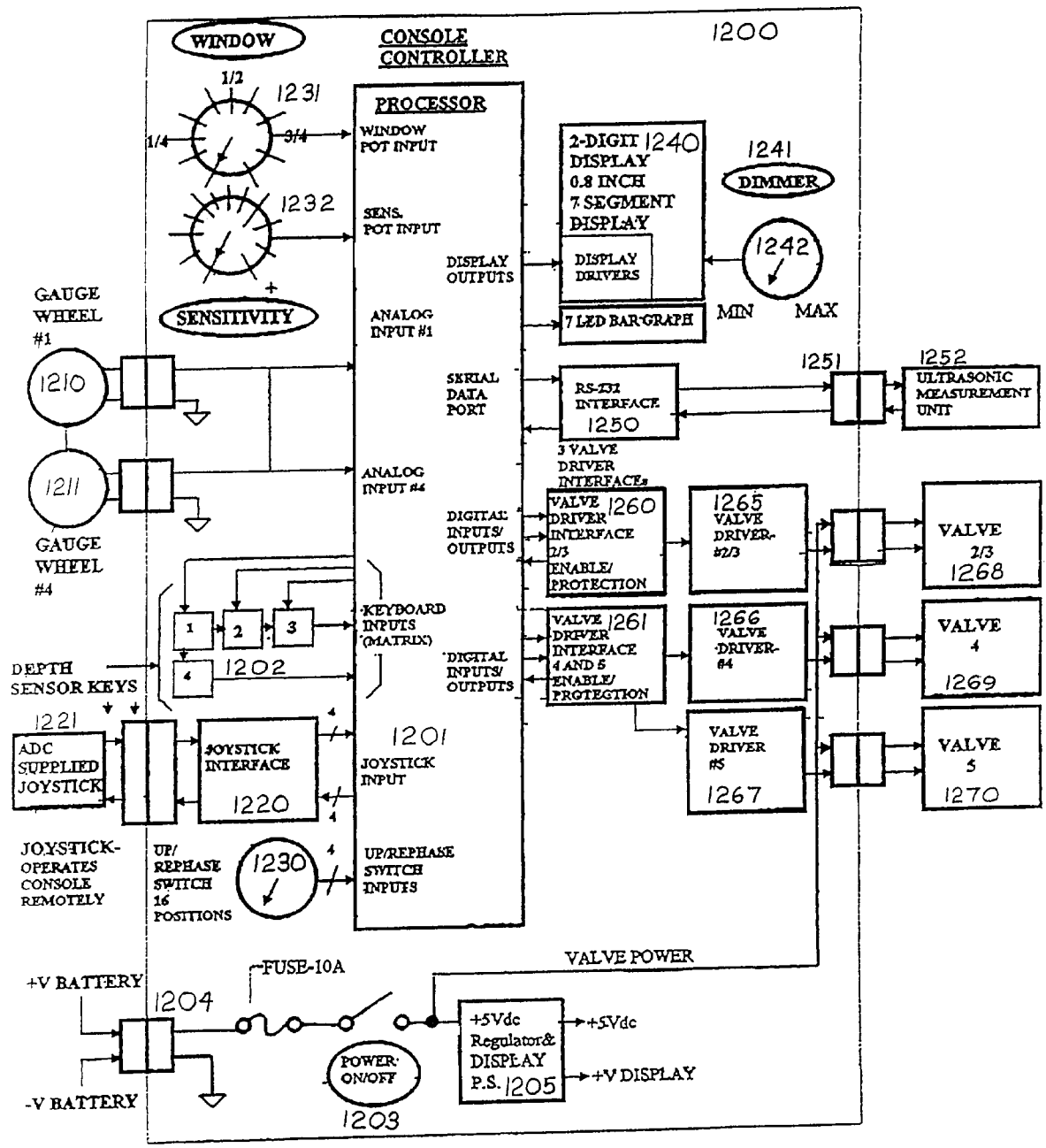
FIG. 12 illustrates a system block diagram for a console processor apparatus according to another embodiment of the present invention.

During operation, the operation of the depth control system is under the operational control of a programmable processing system within the console unit. FIG. 12. illustrates an example embodiment of a processor system. The console controller 1200 comprises a processor 1201 which interfaces with a number of components to control the depth control system. The controller 1200 receives is electrical power from a connection 1204 to a battery which passes through a fuse 1206 and on/off switch 1203. The power source is regulated 1205 to provide the required voltage levels for all of the electronics.

The processor 1201 receives various inputs signals from the window potentiometer 1231 and the sensitivity potentiometer 1232. These signals perform the parameter input functions discussed above to control the operation of the depth control system. The processor 1201 also receives input signals from the gauge wheel sensors 1210–1211 to sense the current height of the device. The processor 1201 receives input signals from the four console keyboard switches 1202 to receive user input settings as described above.

The processor 1201 interfaces with the joystick 1221 through a joystick interface 1220. The joystick 1221 is used to remotely control the operation of the depth control system by providing a convenient user interface to the system. The processor 1201 possesses an RS-232 serial interface 1250 to an ultrasonic position measurement unit 1252. Finally, the processor also receives input signals from the up/rephase 16 position switch 1230.

Turning the Rephase Knob will select different set-up/test modes. Positions 0–3 are READ only, and positions 4–15 can be changed by using the rocker switch.

| Position | Function | Comments |
|---|---|---|
| 0 | reads the voltage provided to the system. | This number should be multiplied by 10. i.e. 1.2 = 12 volts. |
| 1 | reads the input pot #1, | 0 to FF, no scaling, to test if pot is functioning. |
| 2 | reads the input pot #2, | 0 to FF, no scaling, to test if pot is functioning. |
| 3 | reads the input pot #3, | 0 to FF, no scaling, to test if pot is functioning. |
| 4 | (R:0.0–9.9) | The time in which RUN/HOLD/RUN needs to be |

-continued

| Position | Function | Comments |
|---|---|---|
| | | switched in to show settings. |
| 5 | (R:0.0–1.1)1.1 = 3 | Gage wheels (1L, 2LC, 3RC), 0.0 = 4 Gage wheels (+4R). |
| 6 | (R:0.0–9.9) | Time in sec before setting ground (0.0) calibration. |
| 7 | (R:0.0–1.1) sets the buzzer on or off, | 0.0 = off, 1.1 = on. |
| 8 | (R:0.0–9.9) sets the Signal Average Drop off. | The range is 0.0 to 9.9 inches. |
| 9 | (R:0.0–9.9) Threshold value for noting if a pot has fallen off. | From 0 to 99%. So a 9.0 is 90%. |
| 10 | (R:0.0–9.9) Sets the LED update time. | From 0.0 to 9.9 seconds. (Bar graph time = 1/2 LED time). |
| 11 | OPEN | FUTURE USE. |
| 12 | (R:0.0–9.9) Sets mechanical depth time out. | The range is 0.0 to 9.9 seconds. |
| 13 | (R:0.0–9.9) Fast Correction Threshold. | The range is 1/10 of a second. |
| 14 | (R:0.0–9.9) Post Scaling in mv/(.1 inch). | The range is from 0.0 to 9.9. This number should be multiplied by ten to convert to mv/(.1 inch). i.e. 2.0 = 20 mv/(.1 inch). |
| 15 | (R:0.0–9.9) Sample time, of 32 data. | This number should be multiplied by 3.2. |

The Ultrasonic Measurement Module (UMM) serial input possesses four external analog inputs. The four external analog inputs shall measure voltage amplitudes from zero Vdc to +5.00 Vdc using an 8-bit A/D converter located in the processor. The total resolution shall be plus or minus 1 Least-Significant-Bit (LSB) of the A/D converter which is plus or minus 20 millivolts. Transzorb diodes will protect these inputs from over voltages exceeding +30 Vdc. A Sensor Reference (+5.00 Vdc) shall be provided for potentiometers.

This input shall be a RS-232 compatible input to the processor at 9600 baud. Standard RS-232 interfaces will be used to allow the Input to physically connect an Ultrasonic Measurement Module Input to the processor 1201.

The UMM also possess three "on-off" coil driver outputs and an output. A total of three "on-off" low side coil driver outputs shall be provided to drive three valve coils, Coils 2/3, 4 and 5, at 12 Vdc and/or 24 Vdc. No PWM or dither shall be provided for these outputs. Coil currents of up to 1.8 Amperes shall be handled by these drivers on Coil 4. Coil 2/3 and Coil 5 driver shall drive up to 3.6 Amperes. Each driver shall withstand a short circuit without damage and restore its operation when the short is removed. Short circuits shall be detected and reported to the processor which will turn off the coil.

The Ultrasonic Serial Output is a RS-232 compatible output from the processor 1201 at 9600 baud. Standard RS-232 interfaces will be used to allow the output to physically connect an Ultrasonic Measurement Module to the processor.

The processor 1201 generates output signals which are transmitted to a display 1240 to provide information to a user. In one embodiment, the display comprises a plurality of seven-segment display elements to permit the display of various numerals and characters. This display unit may consist of any display device for providing information to a user without deviating from the spirit and scope of the present invention. In one embodiment, the display possesses a dimmer 1241 and a 7 led bar graph 1242.

The processor 1201 also generates output signals to control the various hydraulic valves (1268–1270), These signals are transmitted to various valve drivers 1265–1267 to provide the proper electrical signals from the digital processor to these valves through driver interface circuits 1260–1261. The processor uses these circuits to control the operation of the valves to adjust the height of the depth control system.

Figure 13:
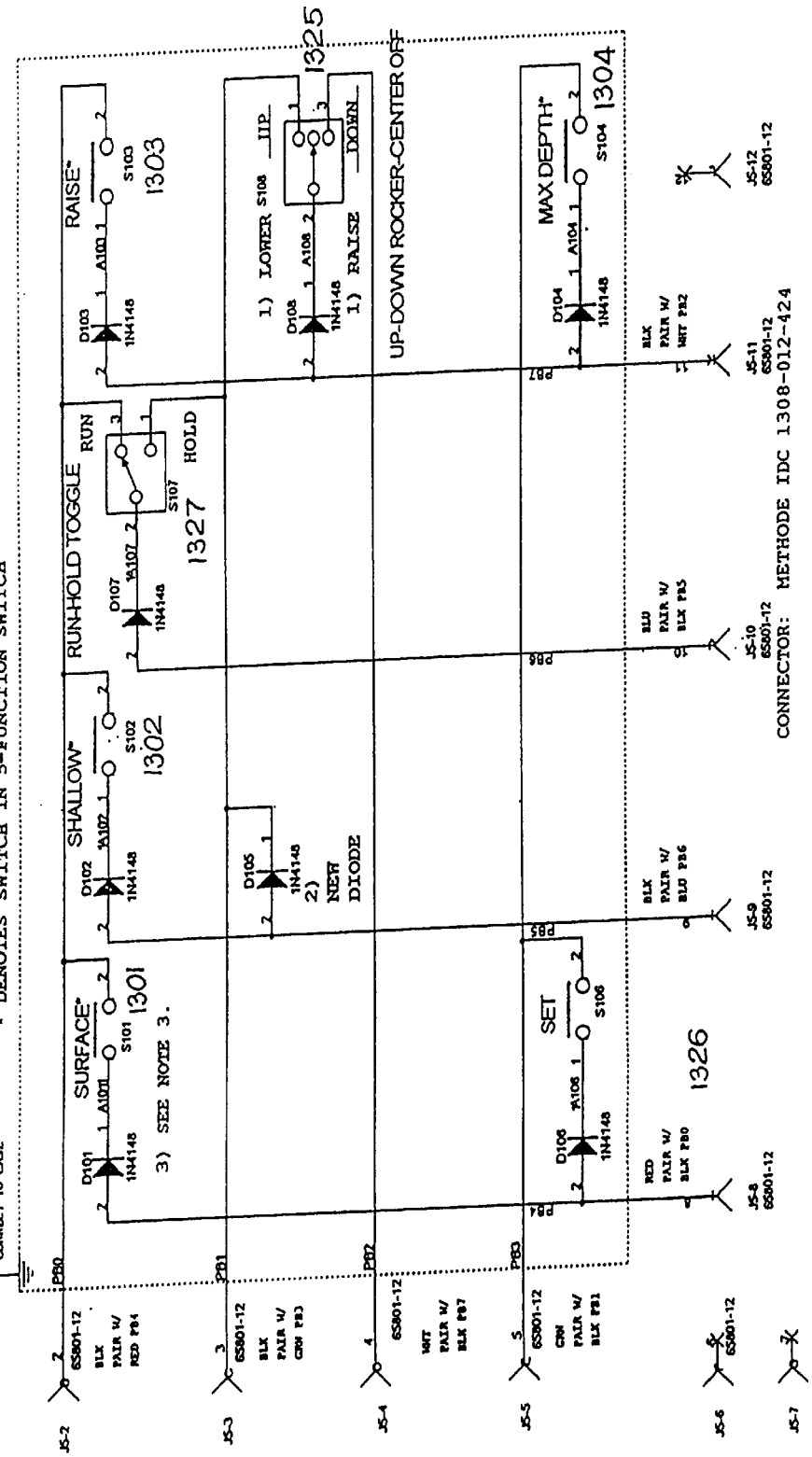
FIG. 13 illustrates a block diagram for joystick controller system according to another embodiment of the present invention.

FIG. 13 illustrates a circuit diagram for the joystick unit. This unit corresponds to the joystick unit shown in FIG. 2. When the joystick is moved to each of the four positions, SCRATCH, SHALLOW, RAISE, and MAX-DEPTH, the corresponding switches 1301–1304 are closed by the joystick unit. The closure of each of these switches generates a signal to the joystick interface 1220 for communication to the processor 1201. The unit also possess a SET 1326, UP/DOWN 1325 and RUN-HOLD 1327 switch which correspond to these same switches illustrated on FIG. 2.

Structured software design practices shall be employed in the present invention. Top-down design of all major modules may accomplished by writing a Software Definition Document which describes all major modules in detail. The modules may be coded in C which will then compile to assembly-level coding for the processor 1201.

The Basic Input-Output System (BIOS) consists of the following blocks: 1) Reset module, 2) Analog to Digital Converter input module, 3) RS232 input module, 4) Valve driver 2/3 output module, 5) Valve drivers 4 and 5 output module, 6) Audible alarm output module, 7) Keypad input module, 8) UP/Rephase switch module, 9) Two-digit display output module, 10) Keyboard and Valve activity indicators output module, 11) Valve enable control module, 12) Seven LED Bar Graph output module and 13) Output register module.

Reset Module

The following devices are reset to an off state: Valve driver 2/3 output module, Valve drivers 4 and 5 output module, Audible alarm output module, Keyboard indicators and Valve activity indicators, Seven LED bar graph output module, Output register control module and Valve enable control module. The Up/rephase switch is configured as an input function. The RS232 Input/Output module is initialized for full duplex, 9600 baud operation. The Keyboard input module is configured to receive and decode key depressions from the Joystick and the Front pane. The Mode Switch is decoded as being in the LOCKED position. The Analog to Digital Converter module is turned off.

Analog to Digital Converter Module

The Analog to Digital Converter when enabled, converts eight channels of analog information, using a mux address to enable an input Channel (AN0 to AN7) and then converts an analog voltage to a digital number 0 to 255 as in section 2.1 (Eight bit resolution). Channel AN7 receives the valve of the Left Sensor #1 (0 to +4.99 Vdc typical). Channel AN6 receives the valve of the Left Sensor #2. Channel AN5 receives the value of the Right Sensor #3. Channel AN4 receives the value of the Right Sensor #4. Channel AN3 receives the value of a TOTAL SPAN potentiometer. Channel AN2 receives the value of a DAMPEN potentiometer. For both potentiometers, 0 Vdc equals ccw position and +5 Vdc equals full clockwise position. Thus, the 295 degrees of potentiometer rotation is divided into 256 steps. Channel AN1 receives a divided by 10 value of the vehicle power voltage. Values of 0 Vdc to +51.1 Vdc can be read, thus each bit represents 0.2 Vdc or 200 milliVolts DC. Channel AN0 reads the Reference Voltage output as seen by the Input Channel potentiometers. Its normal range is +4.75 to +5.25 Vdc and is also Vref voltage for the A/D converter system.

RS232 Input/Output Module

The RS232 Input/Output module uses the SCI module of the ADC processor to implement a full-duplex RS232 9600 baud communications interface. The default mode on reset shall enable UMM operation.

Valve Driver 2/3 Output Module

The Valve driver 2/3 output module is a standard HCT "on-off" non-current feedback module. A latch controls whether valves 2/3, 4 and 5 are enabled. Prior to Valve operation, a short circuit detector comparitor must be "reset". Signal SHORT23H, is reset as an output, by being pulsed LOW (logic 0=0 Vdc) for 50 milliseconds, then be converted to an input to detect a short circuit condition for Valves 2 or 3. The maximum current prior to current shut-down is 8.33 Amperes. The valve draws 40 Watts or 3.9 Amperes.

Valve Drivers 4 and 5 Output Module

The Valve drivers 4 and 5 output module is a standard HCT dual "on-off" non-current feedback module. A latch controls whether valves 2/3, 4 and 5 are enabled. Signal SHORT45H, is reset as an output by being pulsed LOW (logic 0=0 Vdc) for 50 milliseconds, and converted to a input to detect a short circuit condition for Valves 4 or 5. Either Vale 4 or Valve 5 may be on or both may be on. The maximum current prior to current shut-down is 8.3 Amperes. These valves do not draw the same current. Valve 4 will draw 1.9 Amperes while Valve 5 will draw 3.6 Amperes, when on. Worst case current draw is 5.4 Amperes.

Audible Alarm Output Module

The Audible alarm output module is used when 1) the LOCK positions is engaged either by the processor 1201 or the Joystick Controller, 2) when there is a key pressed or when 3) special functions are engaged. The LOCK alarm indication is a steady tone until the controller is out of the LOCK position The key press alarm position is a 100 millisecond beep tone.

Keyboard Input Module

This module decodes the Mode Switch, the 4 Membrane panel keys and the Joystick Controller. The default position of the Mode Switch is the LOCK position. Upon reset, the processor 1201 will be in the LOCK mode for safety reasons. The other modes of the Mode Switch are AUTO and MANUAL. 7 of the 11 switches are the Open or closed type, while the 4 DEPTH SENSOR switches are of the "Toggle" type. These switches are turned off upon ADC reset. When the sensors are set up (i.e. turned ON), depressing the switch will "toggle" the sensor on and turn "ON" the GREEN indicator LED above the switch. Depressing the switch a second time will turn the sensor "OFF" and the LED "OFF." Key repeats are allowed for only the "toggle" functions.

Up/Rephase Switch Input Module

This module inputs UP/REPHASE switch position.

Two-Digit Display Output Module

The two digit display module is two seven segment displays which show inches, 0 to 9, and tenths of inches, 0.1 to 0.9, respectively. Thus, depths of 0.0 to 9.9 inches will be shown on the display. Numbers of 0 through 9 and several special characters must be outputted to latches. Numbers 0 through −9 inches (integer values) may also be shown.

Keyboard and Valve Activity Indicators Output Module

Seven LEDS are controlled by this module. A buffered bit BPC0 signal controls a RIGHT SENSOR #4 indicator, D104. A logic "1" on this bit turns on the indicator and a logic "0" turns off the indicator. Similarly, a BPC1 signal controls a LEFT SENSOR #2 indicator. A BPC2 signal controls a LEFT SENSOR #1 indicator. A BPC3 signal controls a RIGHT SENSOR #4 indicator. LEDS are located on the Membrane switch panel. A BCP4 signal controls the Valve 2/3 Activity indicator, which is located on the processor circuit card assembly. A steady RED indication shows that the Valve 2/3 is on, while a flashing RED indication (one per second) shows that Valve 2/3 is shorted. The logic levels are the same for the Valve indicators as they are for the membrane panel indicators. A BPC6 signal controls the Valve 4 Activity indicator and a BPC7 signal controls the Valve 5 Activity indicator. These indicators all operate identically to the Valve 2/3 activity indicator. These indicators are all latched on or off into a register.

Valve Enable Control Module

Three bits control the operation of Valves 2/3, 4 and 5. Three bits of the buffered data bus are used to latch on or off the respective valve(s). These bits are latched into register U20 under Output Register control.

Seven LED Bar Graph Output Module

The seven LED bar graph, in the normal operating mode, lights one of the seven LEDs to indicate span and deviation.

Output Register Control Module

The data for the Two-digit seven segment display, the Seven LED bar graph, the Keyboard and Valve Activity Indicators and the Valve Enable control are all latched into external registers using a one of four decoder and a Timer on the processor to generate a strobe pulse. Signals PA0 and PA1 are used to generate an address to decode a strobe pulse for latching the respective data on the buffered data bus to the proper device. The Timer output pulse should be at least 1 microsecond long when latching is desired. Strobe output G0H latches the Units (Inches) into a register to display the depth in inches. Strobe output G2H signal latches the Keyboard and Valve Activity indicators into a register. Strobe output G2H signal also enables Valves 2,3, 4 and 5 in a Register. Strobe output G3H signal latches the date for the Seven LED bar graph.

Figure 14:
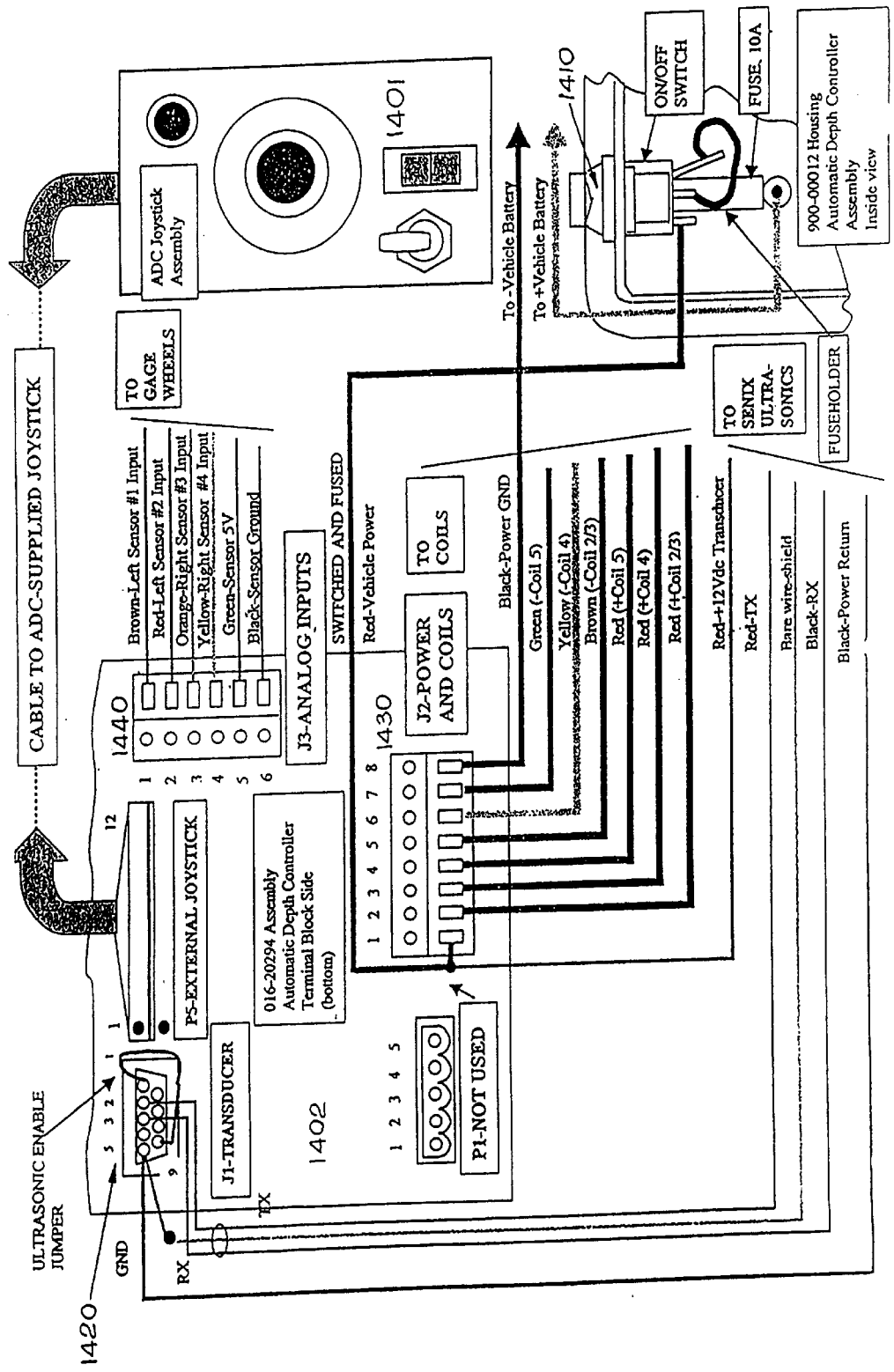
FIG. 14 illustrates another system block diagram for an ultrasonic-based automatic depth control system according to another embodiment of the present invention.

FIG. 14 illustrates a complete system diagram for the controller system comprising a joystick unit 1401, a console unit 1402. and a power switch 1410. The console 1402 interfaces with the ultrasonic transceivers through a serial connection 1420. The console 1402 receives the analog input signals from the gauge wheels through interface 1440 and generates and receives signals to the hydraulic system through connection 1430.

The foregoing description of the exemplary embodiment of the invention has been presented for the purposes of illustration and description. It is not intended to be exhaustive or to limit the invention to the precise form disclosed.

Many modifications and variations are possible in light of the above teaching. It is intended that the scope of the invention be limited not with this detailed description, but rather by the claims appended hereto.

What is claimed is:

1. An automatic depth control system for controlling a measured position of a device having a frame above the ground as the device is moved across a surface, the automatic depth control system comprising:

a joystick input device for specifying a plurality of position settings;

a device position sensor;

a device position display unit; and a hydraulic position control system for maintaining the measured device position within a specified position window around a set position;

wherein device position sensor comprises:

a horizontal support member having a first and second ends, the horizontal support member is coupled to the device frame;

a wheel leg extension having a top and bottom end, the top end of the wheel leg extension being oriented in a forward position when the device is moving in a forward direction;

a bracket plate coupled to the horizontal support member for attaching the device position sensor to the device;

a sensor assembly coupled to the first end of the horizontal support member and also coupled to the top end of the wheel support extension for sensing a measured angle between the horizontal support member and the wheel leg extension;

a compressible support assembly having a top and bottom end, the top end of the compressible support assembly being coupled to the second end of the horizontal support member; and a rotating wheel coupled to the bottom end of the wheel leg assembly and also coupled to the bottom end of the compressible wheel assembly.

2. The automatic depth control system according to claim 1, wherein the compressible support assembly comprises a shock absorber.

3. The automatic depth control system according to claim 1, wherein the sensor assembly comprises:

a sensor housing coupled to the horizontal support member;

a potentiometer coupled to the sensor housing for generating a voltage signal corresponding to the measured angle;

a position axle bearing assembly coupled between potentiometer and the wheel extension assembly, the position shaft rotates about a length-wise axis as the measured angle between the horizontal support member and the wheel leg extension changes;

wherein the rotation of the position shaft changes the resistance setting of the potentiometer to alter the voltage signal generated by the sensor assembly corresponding to the measured angle.

4. The automatic depth control system according to claim 3, wherein the wherein the sensor assembly further comprises:

a potentiometer set arm coupled between the sensor housing and the potentiometer for adjusting the voltage signal generated by the sensor assembly when the device is located at a known position.

5. The automatic depth control system according to claim 4, wherein the voltage signal generated by the sensor assembly is transmitted to the hydraulic position control system in order to provide the position of the device from the measured angle between the horizontal support member and the wheel leg extension.

6. The automatic depth control system according to claim 5, wherein the horizontal support member is mounted below the device frame.

7. The automatic depth control system according to claim 4, wherein the horizontal support member is mounted above the device frame.

8. An automatic depth control system for controlling a measured position of a device having a frame above the ground as the device is moved across a surface, the automatic depth control system comprising:

a joystick input device for specifying a plurality of position settings;

a device position sensor;

a device position display unit; and a hydraulic position control system for maintaining the measured device position within a specified position window around a set position;

wherein device position sensor comprises:

a horizontal support member having a first and second ends the horizontal support member is coupled to the device frame;

a wheel leg extension having a top and bottom end;

a bracket plate coupled to the horizontal support member for attaching the device position sensor to the device;

a sensor assembly coupled to the first end of the horizontal support member and also coupled to the top end of the wheel support extension for sensing a measured angle between the horizontal support member and the wheel leg extension;

a compressible support assembly having a top and bottom end, the top end of the compressible support assembly being coupled to the second end of the horizontal support member; and a rotating wheel coupled to the bottom end of the wheel leg assembly and also coupled to the bottom end of the compressible wheel assembly;

wherein
      the sensor assembly comprises:
         a sensor housing coupled to the horizontal support member;
         a potentiometer coupled to the sensor housing for generating a voltage signal corresponding to the measured angle;
         a potentiometer set arm coupled between the sensor housing and the potentiometer for adjusting the voltage signal generated by the sensor assembly when the device is located at a known position; and
         a position axle bearing assembly coupled between potentiometer and the wheel extension assembly, the position shaft rotates about a length-wise axis as the measured angle between the horizontal support member and the wheel leg extension changes; and
         the rotation of the position shaft changes the resistance setting of the potentiometer to alter the voltage signal generated by the sensor assembly corresponding to the measured angle.

9. A device position sensor for use as part of an automatic depth control system which determines the position of a frame of a device above a programmable ground-zero position, device position sensor comprises:
- a horizontal support member having a first and second ends, the horizontal support member being coupled to device frame;
- a wheel leg extension having a top and bottom end;
- a bracket plate coupled to the horizontal support member for attaching the device position sensor to the device;
- a sensor assembly coupled to the first end of the horizontal support member and also coupled to the top end of the wheel support extension for sensing a measured angle between the horizontal support member and the wheel leg extension;
- a compressible support assembly having a top and bottom end, the top end of the compressible support assembly being coupled to the second end of the horizontal support member; and
- a rotating wheel coupled to the bottom end of the wheel leg assembly and also coupled to the bottom end of the compressible wheel assembly;
- wherein
  - the sensor assembly comprises:
    - a sensor housing coupled to the horizontal support member;
    - a potentiometer coupled to the sensor housing for generating a voltage signal corresponding to the measured angle;
    - a potentiometer set arm coupled between the sensor housing and the potentiometer for adjusting the voltage signal generated by the sensor assembly when the device is located at a known position; and
    - a position axle bearing assembly coupled between potentiometer and the wheel extension assembly, the position shaft rotates about a length-wise axis as the measured angle between the horizontal support member and the wheel leg extension changes; and
    - the rotation of the position shaft changes the resistance setting of the potentiometer to alter the voltage signal generated by the sensor assembly corresponding to the measured angle.

10. The device position sensor according to claim 9, wherein the horizontal support member is mounted below the device frame.

11. The device position sensor according to claim 9, wherein the horizontal support member is mounted above the device frame.

* * * * *

UNITED STATES PATENT AND TRADEMARK OFFICE
CERTIFICATE OF CORRECTION

PATENT NO. : 6,085,846
DATED : July 11, 2000
INVENTOR(S) : Buchl et al.

It is certified that error appears in the above-identified patent and that said Letters Patent is hereby corrected as shown below:

Column 1,
Lines 54, 55: "Sioux Fall" should read -- Sioux Falls --

Column 3,
Line 15: "electrostatic" should read -- electro-static --
Line 38: "Fig. 3A-D" should read -- Figs. 3A-D Column 4,
Line 17: "On-off" should read -- On-Off --

Column 7,
Line 49: "tranducer" should read -- transducer --
Line 50: "tranducer" should read -- transducer --

Column 13,
Line 59: "led bar graph" should read -- LED Bar Graph --

Column 14,
Line 34: "insert -- be -- after the word "may"

Column 15,
Line 11: "milliVolts" should read -- millivolts --
Line 42: "Vale" should read -- Valve --

Column 16,
Line 11: "outputted" should read -- output --

UNITED STATES PATENT AND TRADEMARK OFFICE
CERTIFICATE OF CORRECTION

PATENT NO. : 6,085,846
DATED : July 11, 2000
INVENTOR(S) : Buchl et al.

It is certified that error appears in the above-identified patent and that said Letters Patent is hereby corrected as shown below:

Column 16,
Line 42: "LED bar graph" should read -- LED Bar Graph --
Line 55: "LED bar graph" should read -- LED Bar Graph --

Column 17,
Line 62, delete "wherein the" after the words "claim 3,"

Signed and Sealed this

Twenty-first Day of August, 2001

Attest:

NICHOLAS P. GODICI
Attesting Officer  Acting Director of the United States Patent and Trademark Office